United States Patent
Sen et al.

(10) Patent No.: US 11,722,188 B1
(45) Date of Patent: Aug. 8, 2023

(54) TECHNIQUES FOR ESTIMATING MISALIGNMENT BETWEEN MULTIPLE ANTENNA ARRAYS

(71) Applicant: QUALCOMM Incorporated, San Diego, CA (US)

(72) Inventors: Pinar Sen, San Diego, CA (US); Naga Bhushan, San Diego, CA (US); Peter Gaal, San Diego, CA (US); Seyong Park, San Diego, CA (US); Renqiu Wang, San Diego, CA (US); Krishna Kiran Mukkavilli, San Diego, CA (US); Tingfang Ji, San Diego, CA (US); Hwan Joon Kwon, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/666,755

(22) Filed: Feb. 8, 2022

(51) Int. Cl.
*H04B 7/0456* (2017.01)

(52) U.S. Cl.
CPC .................... *H04B 7/0456* (2013.01)

(58) Field of Classification Search
CPC .. H04B 7/0456; H04B 7/0802; H04B 7/0413; H04B 7/0408; H04B 7/10; H04B 17/318; H04B 17/336; H04B 17/309; H04B 7/0697; H04B 7/0617
See application file for complete search history.

(56) References Cited

U.S. PATENT DOCUMENTS

| | | | | |
|---|---|---|---|---|
| 10,567,941 | B2* | 2/2020 | Jiang | H04W 4/80 |
| 2018/0095529 | A1* | 4/2018 | Tokubo | A63F 13/25 |
| 2022/0107381 | A1* | 4/2022 | Moon | H04B 7/0695 |
| 2022/0407579 | A1* | 12/2022 | Landis | H04B 17/309 |
| 2022/0408274 | A1* | 12/2022 | Horn | H04W 24/08 |
| 2022/0408426 | A1* | 12/2022 | Horn | H04W 72/046 |
| 2022/0416417 | A1* | 12/2022 | Zhang | H04B 7/0671 |
| 2022/0416848 | A1* | 12/2022 | Zhang | H01Q 3/36 |

OTHER PUBLICATIONS

International Search Report and Written Opinion—PCT/US2023/060559—ISA/EPO—Mar. 28, 2023 (2100638WO).
Moon J., et al., "Line-of-Sight Communications with Antenna Misalignments", ICC 2021—IEEE International Conference on Communications, IEEE, Jun. 14, 2021, XP033953930, 6 pages, figures 1,2, 5, section II.

* cited by examiner

*Primary Examiner* — Khanh C Tran
(74) *Attorney, Agent, or Firm* — Holland & Hart LLP/Qualcomm Incorporated

(57) ABSTRACT

Methods, systems, and devices for wireless communications are described. A first wireless device may identify a translational or rotational misalignment between a first antenna array of the first wireless device and a second antenna array of a second wireless device that is in line-of-sight (LoS) wireless communication with the first wireless device via a channel. The first wireless device may update a channel matrix for the channel based on the translational or rotational misalignment, where the first wireless device may update the channel matrix with one or more beam steering metrics of the first antenna array so as to improve a beam alignment between the first antenna array and the second antenna array. The first wireless device may communicate with the second wireless device in accordance with the updated channel matrix.

28 Claims, 12 Drawing Sheets

TECHNIQUES FOR ESTIMATING MISALIGNMENT BETWEEN MULTIPLE ANTENNA ARRAYS

FIELD OF TECHNOLOGY

The following relates to wireless communications, including techniques for estimating misalignment between multiple antenna arrays.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may communicate with one another based on a channel matrix associated with the channel between the devices. A transmitting device may use the channel matrix to identify a precoding matrix and a receiving device may identify a post-processing matrix based on the channel matrix. The transmitting device may transmit a signal to the receiving device in accordance with the precoding matrix and the receiving device may receive the signal and apply the post-processing matrix to the received signal. Techniques for determining the channel matrix, the precoding matrix, the post-processing matrix, or a combination thereof may be improved.

SUMMARY

The described techniques relate to improved methods, systems, devices, and apparatuses that support techniques for estimating misalignment between multiple antenna arrays. Generally, the described techniques provide for improved methods of determining a channel matrix, the precoding matrix, the post-processing matrix, or a combination thereof. The improved methods may include a first device (e.g., a transmitting device, a receiving device) identifying translational misalignment (e.g., parallel shift), rotational misalignment, or a combination thereof between corresponding antenna arrays of the first device and a second device, where the first device and the second device have a line-of-sight (LoS) path to another. The first device and/or the second device may utilize the misalignment to update the channel matrix, the precoding matrix, the post-processing matrix, or a combination thereof. For example, a first wireless device may identify a translational or rotational misalignment between a first antenna array of the first wireless device and a second antenna array of a second wireless device that is in LoS wireless communication with the first wireless device via a channel. The first wireless device may update a channel matrix for the channel based on the translational or rotational misalignment, where the first wireless device may update the channel matrix with one or more beam steering metrics of the first antenna array so as to improve a beam alignment between the first antenna array and the second antenna array. The first wireless device may communicate with the second wireless device in accordance with the updated channel matrix.

The beam steering metrics may account for misalignment between antenna arrays of the first wireless device and the second wireless device. Accordingly, updating the channel matrix, the precoding matrix, the post-processing matrix, or a combination thereof based on the beam steering metrics may improve alignment between the antenna arrays of the first wireless device and the second wireless device.

A method for wireless communications at a first wireless device is described. The method may include identifying a translational or rotational misalignment between a first antenna array of the first wireless device and a second antenna array of a second wireless device that is in line-of-sight wireless communication with the first wireless device via a channel, updating a channel matrix for the channel based on the translational or rotational misalignment, the channel matrix updated with one or more beam steering metrics of the first antenna array so as to improve a beam alignment between the first antenna array and the second antenna array, and communicating with the second wireless device in accordance with the updated channel matrix.

An apparatus for wireless communications is described. The apparatus may include a processor, memory coupled with the processor, and instructions stored in the memory. The instructions may be executable by the processor to cause the apparatus to identify a translational or rotational misalignment between a first antenna array of a first wireless device and a second antenna array of a second wireless device that is in line-of-sight wireless communication with the first wireless device via a channel, update a channel matrix for the channel based on the translational or rotational misalignment, the channel matrix updated with one or more beam steering metrics of the first antenna array so as to improve a beam alignment between the first antenna array and the second antenna array, and communicate with the second wireless device in accordance with the updated channel matrix.

Another apparatus for wireless communications is described. The apparatus may include means for identifying a translational or rotational misalignment between a first antenna array of a first wireless device and a second antenna array of a second wireless device that is in line-of-sight wireless communication with the first wireless device via a channel, means for updating a channel matrix for the channel based on the translational or rotational misalignment, the channel matrix updated with one or more beam steering metrics of the first antenna array so as to improve a beam alignment between the first antenna array and the second antenna array, and means for communicating with the second wireless device in accordance with the updated channel matrix.

A non-transitory computer-readable medium storing code for wireless communications is described. The code may include instructions executable by a processor to identify a translational or rotational misalignment between a first antenna array of a first wireless device and a second antenna array of a second wireless device that is in line-of-sight wireless communication with the first wireless device via a channel, update a channel matrix for the channel based on the translational or rotational misalignment, the channel matrix updated with one or more beam steering metrics of the first antenna array so as to improve a beam alignment between the first antenna array and the second antenna array, and communicate with the second wireless device in accordance with the updated channel matrix.

Some examples of the method, apparatuses, and non-transitory computer-readable medium described herein may further include operations, features, means, or instructions for identifying a misalignment vector based on the translational or rotational misalignment between the first antenna array of the first wireless device and the second antenna array of the second wireless device.

Some examples of the method, apparatuses, and non-transitory computer-readable medium described herein may further include operations, features, means, or instructions for identifying, for the first antenna array and based on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, where the x-axis and y-axis may be orthogonal to a z-axis which may be in a direction of the communications and determining a rotation matrix based on either the first angle of rotation and the corresponding first unit vector or the second angle of rotation and, subsequently, the third angle of rotation.

In some examples of the method, apparatuses, and non-transitory computer-readable medium described herein, identifying the translational or rotational misalignment between the first antenna array of the first wireless device and the second antenna array of the second wireless device may include operations, features, means, or instructions for receiving, from the second wireless device, an indication of the translational or rotational misalignment between the first antenna array and the second antenna array.

Some examples of the method, apparatuses, and non-transitory computer-readable medium described herein may further include operations, features, means, or instructions for transmitting, to the second wireless device, an indication of the translational or rotational misalignment between the first antenna array and the second antenna array.

In some examples of the method, apparatuses, and non-transitory computer-readable medium described herein, identifying the translational or rotational misalignment between the first antenna array of the first wireless device and the second antenna array of the second wireless device may include operations, features, means, or instructions for identifying that the translational or rotational misalignment may be a translational misalignment where the first antenna array may be shifted along an x-axis, a y-axis, or a combination thereof with respect to the second antenna array, where the x-axis and y-axis may be orthogonal to a z-axis which may be in a direction of the communications.

In some examples of the method, apparatuses, and non-transitory computer-readable medium described herein, identifying the translational or rotational misalignment between the first antenna array of the first wireless device and the second antenna array of the second wireless device may include operations, features, means, or instructions for identifying that the translational or rotational misalignment may be a rotational misalignment where the first antenna array may be rotated around an x-axis, a y-axis, or a combination thereof with respect to the second antenna array, where the x-axis and y-axis may be orthogonal to a z-axis which may be in a direction of the communications.

In some examples of the method, apparatuses, and non-transitory computer-readable medium described herein, updating the channel matrix may include operations, features, means, or instructions for updating the channel matrix by multiplying a previous channel matrix by a phase component, where the phase component may be based on a misalignment vector, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

In some examples of the method, apparatuses, and non-transitory computer-readable medium described herein, updating the channel matrix may include operations, features, means, or instructions for updating the channel matrix by multiplying a previous channel matrix by a phase component, where the phase component may be based on one or more first unit vectors and one or more first angles of rotation associated with the first antenna array, one or more second unit vectors and one or more second angles of rotation associated with the second antenna array, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

Some examples of the method, apparatuses, and non-transitory computer-readable medium described herein may further include operations, features, means, or instructions for calculating a precoding matrix by applying singular value decomposition to the channel matrix, where the one or more beam steering metrics may be associated with the precoding matrix.

Some examples of the method, apparatuses, and non-transitory computer-readable medium described herein may further include operations, features, means, or instructions for calculating a post-processing matrix by applying singular value decomposition to the channel matrix, where the one or more beam steering metrics may be associated with the post-processing matrix.

In some examples of the method, apparatuses, and non-transitory computer-readable medium described herein, updating the channel matrix may include operations, features, means, or instructions for updating a precoding matrix by multiplying a previous precoding matrix by a phase component.

In some examples of the method, apparatuses, and non-transitory computer-readable medium described herein, the phase component may be based on a misalignment vector, a first location vector indicative of a location of an antenna element of the first antenna array with respect to a center of the first antenna array, and a distance vector indicative of a distance between the first antenna array and the second antenna array.

In some examples of the method, apparatuses, and non-transitory computer-readable medium described herein, the phase component may be based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

In some examples of the method, apparatuses, and non-transitory computer-readable medium described herein, updating the channel matrix may include operations, features, means, or instructions for updating a post-processing matrix by multiplying a previous post-processing matrix by a phase component.

In some examples of the method, apparatuses, and non-transitory computer-readable medium described herein, the phase component may be based on a misalignment vector, a first location vector indicative of a location of an antenna element of the first antenna array with respect to a center of the first antenna array, and a distance vector indicative of a distance between the first antenna array and the second antenna array.

In some examples of the method, apparatuses, and non-transitory computer-readable medium described herein, the phase component may be based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

Some examples of the method, apparatuses, and non-transitory computer-readable medium described herein may further include operations, features, means, or instructions for receiving one or more signals from the second wireless device, where identifying the translational or rotational misalignment may be based on receiving the one or more signals, the one or more signals being reference signals.

Some examples of the method, apparatuses, and non-transitory computer-readable medium described herein may further include operations, features, means, or instructions for updating the channel matrix may be based on the first antenna array being in a far field region with respect to the second antenna array.

In some examples of the method, apparatuses, and non-transitory computer-readable medium described herein, the first wireless device may be a user equipment (UE) and the second wireless device may be a base station and the first wireless device may be a base station and the second wireless device may be a UE.

DETAILED DESCRIPTION

Figure 1:
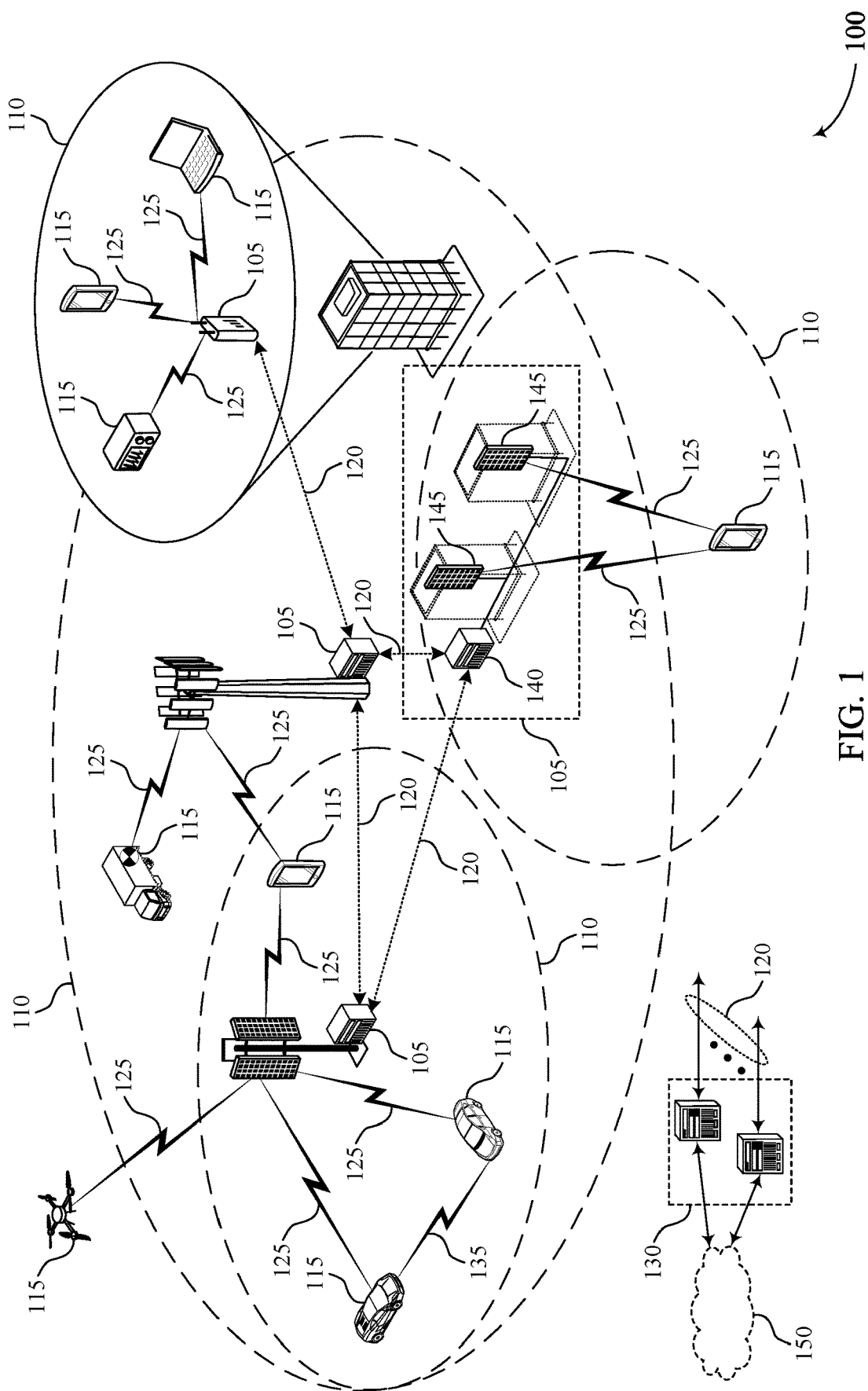
FIG. 1 illustrates an example of a wireless communications system that supports techniques for estimating misalignment between multiple antenna arrays in accordance with aspects of the present disclosure.

In some wireless communications systems, devices may communicate with one another based on a channel matrix associated with the channel between the devices. A transmitting device may use the channel matrix to identify a precoding matrix and a receiving device may use the channel matrix to identify a post-processing matrix. The transmitting device may transmit a signal to the receiving device in accordance with the precoding matrix and the receiving device may receive the signal and apply the post-processing matrix to the received signal. Therefore, prior to communications, the transmitting device and/or the receiving device may be configured to calculate the channel matrix. The channel matrix calculation may include a line-of-sight (LoS) parameter and a non-LoS parameter and may depend on a configuration of the receiver antenna array and the transmitter antenna array, and a distance between each antenna element pair of the receiver and transmitter arrays. Upon calculating the channel matrix, the transmitting device may apply singular value decomposition (SVD) to identify the precoder matrix and the receiving device may apply SVD to identify the post-processing matrix.

In some cases, an antenna array of the transmitting device and the antenna array of the receiving device may satisfy a complete LoS scenario (e.g., one hundred percent LoS between the transmitting device and the receiving device), in which, the centers of the two antenna arrays may align, and the planes of the antenna arrays may be parallel to one another (e.g., the antenna arrays may face each other). In such cases, the transmitting device, the receiving device, or both may simplify the channel matrix calculation. For example, the distance between the centers of the two antenna arrays may be used in the channel matrix calculation (e.g., the antenna array of the transmitting device and the antenna array of the receiving device), rather than calculating the distance between each antenna element pair. However, in some cases, if there is any misalignment (e.g., rotational misalignment, translational misalignment) between the two antenna arrays, the devices may not use such simplifications. For example, one or both of the antenna arrays may shift along the x and/or y-axis (e.g., parallel shift, translation misalignment), and/or one or both of the antenna arrays may rotate around the z axis (e.g., rotational misalignment). In such cases, the channel matrix, precoder matrix and post-processing matrix may be updated, without simplifications, resulting in a heavy computational requirement at the transmitting device, receiving device, or both.

To improve methods of calculating a channel matrix, a precoding matrix, a post-processing matrix, or a combination thereof between at least two communicating devices, a receiving device, a transmitting device, or both may be configured to identify misalignment (e.g., rotational misalignment, translational misalignment) between one another. For example, the transmitting device, the receiving device, or both may identify a misalignment vector and/or a rotation angle and rotation vector, where the misalignment vector and rotation angle and vector are a metric of any translational misalignment and rotational misalignment, respectively between the devices. The devices may use the misalignment vector and/or rotation angle and vector to update the channel matrix, the precoder matrix, the post-processing matrix, or a combination thereof. In some cases, each device may individually determine the misalignment vector and/or rotational angle and vector. In some cases, one of the devices may determine the misalignment vector and/or rotation angle and vector and signal the misalignment vector and/or rotational angle and vector to the other device. Calculating the channel matrix, the precoder matrix, the post-processing matrix, or a combination thereof based on the misalignment vector and/or rotation angle and vector may result in a simplified computation. In some cases, the device may implement such simplified calculation when there is strong LoS between a receiving device and a transmitting device, where in such cases, the NLoS parameter of the channel matrix equation may be ignored.

Particular aspects of the subject matter described herein may be implemented to realize one or more advantages. The described techniques may support improvements in updating a channel matrix, a precoding matrix, a post-processing matrix, or a combination thereof by decreasing calculation overhead, among other advantages. As such, supported techniques may include improved network operations and, in some examples, may promote network efficiencies, among other benefits.

Aspects of the disclosure are initially described in the context of wireless communications systems. Aspects are the described with reference to a process flow. Aspects of the disclosure are further illustrated by and described with reference to apparatus diagrams, system diagrams, and flowcharts that relate to techniques for estimating misalignment between multiple antenna arrays.

FIG. 1 illustrates an example of a wireless communications system 100 that supports techniques for estimating misalignment between multiple antenna arrays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a user equipment (UE) 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a first wireless device (e.g., a UE 115, a base station 105, a network node) may identify a translational or rotational misalignment between a first antenna array of the first wireless device and a second antenna array of a second wireless device (e.g., a UE 115, a base station 105, a network node) that is in LoS wireless communication with the first wireless device via a channel. The first wireless device may update a channel matrix for the channel based on the translational or rotational misalignment, where the first wireless device may update the channel matrix with one or more beam steering metrics of the first antenna array so as to improve a beam alignment between the first antenna array and the second antenna array. The first wireless device may communicate with the second wireless device in accordance with the updated channel matrix.

Figure 2:
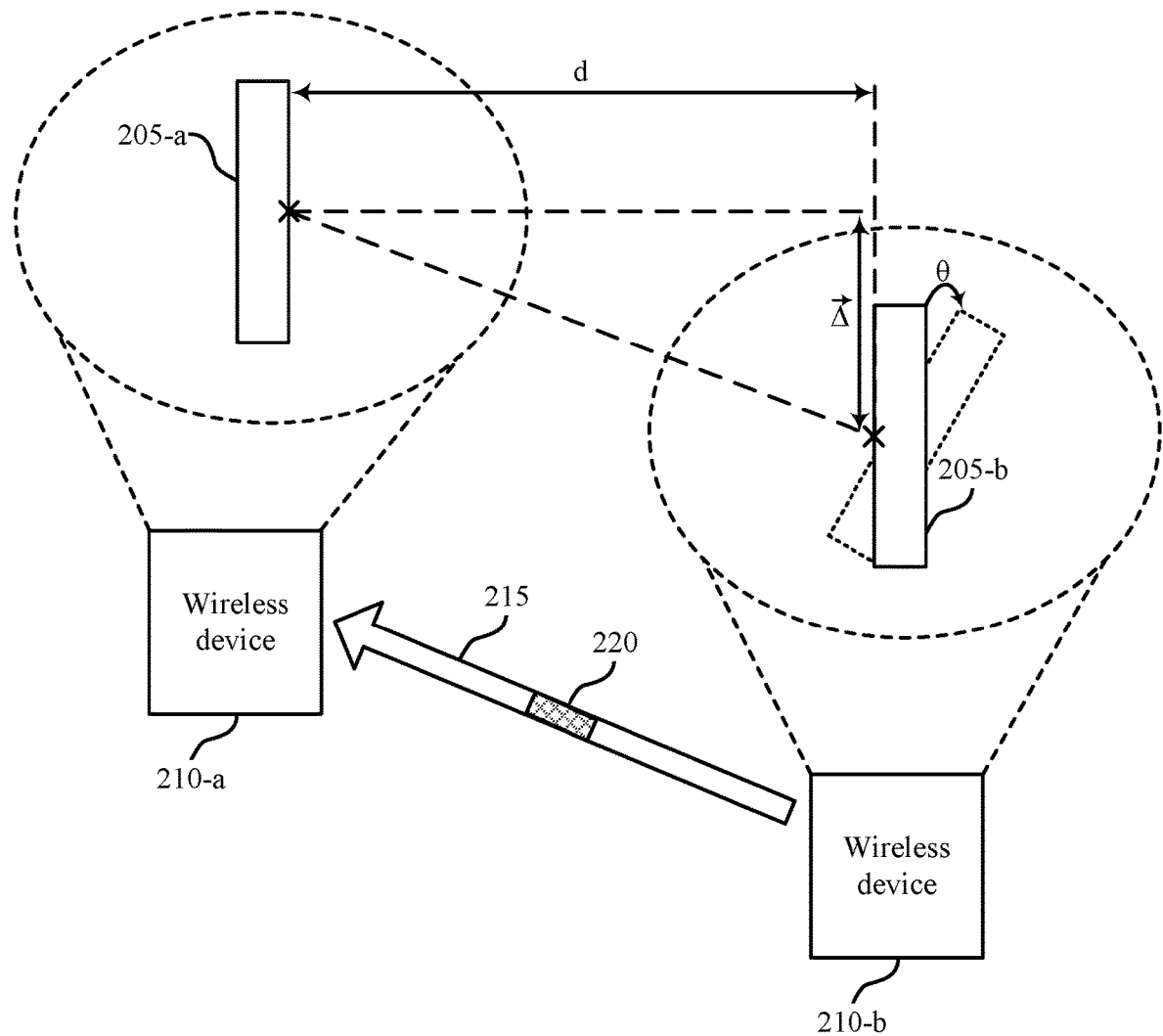
FIGS. 2 through 4 illustrate examples of wireless communications systems that support techniques for estimating misalignment between multiple antenna arrays in accordance with aspects of the present disclosure.

FIG. 2 illustrates an example of a wireless communications system 200 that supports techniques for estimating misalignment between multiple antenna arrays in accordance with aspects of the present disclosure. The wireless communications system 200 may include wireless devices 210-a and 210-b. Wireless devices 210-a and/or 210-b may be base stations, UEs, network nodes, etc., which may be examples of the corresponding devices as described with reference to FIG. 1. Wireless devices 210-a and 210-b may be different types of devices, where wireless device 210-a may be a UE, and wireless device 210-b may be a base station, or vice versa, for example. In some cases, wireless devices 210-a and 210-b may be the same type of device, where both wireless device 210-a and wireless device 210-b are UEs, for example. In some cases, one of wireless devices 210-a and 210-b may be a serving device (e.g., a serving base station). In some cases, one or both of wireless devices 210-a and 210-b implement a procedure for identify misalignment between antenna arrays of wireless devices 210-a and 210-b.

In some wireless communications systems, such as wireless communications system 200, the wireless devices 210 may communicate with one another based on a channel matrix associated with the channel between the wireless devices 210. The channel matrix calculation may include a LoS parameter and a non-LOS parameter indicative of the channel between the wireless devices 210. For example, a channel matrix indicative of a channel between multiple wireless devices may be calculated in accordance with a Rician channel model, as described by Equation 1.

$$H = aH_{LoS} + bH_{NLoS} \quad (1)$$

$H_{LoS}$ may be calculated by Equation 2, $H_{NLoS} \in$ {i. i. d. Raleigh, CDL–x, TDL–x}, $a^2 + b^2 = 1$, and an LoS percentage may be equal to $a^2$.

$$H_{LoS} = \frac{\exp\left(-i2\pi \frac{r_{jk}}{\lambda}\right)}{r_{jk}/\lambda} \quad (2)$$

$r_{jk}$ may refer to the distance between each antenna element pair of the receiver and transmitter arrays. In some implementations, a transmitting device (e.g., wireless device 210-a, wireless device 210-b) may use the channel matrix, H, to identify a precoding matrix (e.g., a precoder), V, and a receiving device (e.g., wireless device 210-a, wireless device 210-b) may use the channel matrix, H, to identify a post-processing matrix (e.g., post-processor), U. The transmitting device may transmit a signal to the receiving device in accordance with the precoding matrix and the receiving device may receive the signal and apply the post-processing matrix to the received signal. For example, upon calculating the channel matrix, the transmitting device may apply SVD to identify the precoder matrix and the receiving device may apply SVD to identify the post-processing matrix, and then the devices may communicate accordingly. The channel matrix, and thus the precoding matrix and post-processing matrix depend on the configuration of the receiver antenna array and the transmitter antenna array, and a distance between each antenna element pair of the receiver and transmitter arrays.

In some cases, an antenna array of the transmitting device and the antenna array of the receiving device may satisfy a complete LoS scenario (e.g., one hundred percent LoS between the transmitting device and the receiving device), in which, the centers of the two antenna arrays may align, and the planes of the antenna arrays may be parallel to one another (e.g., the antenna arrays face one another). In a strong LoS scenario (e.g., a>>b), LoS MIMO (LSM) techniques may be employed, which may apply to circular antenna arrays, 1-dimensional antenna arrays, 2-dimensional antenna arrays, or a combination there. LSM may provide increased multiplexing gain when the distance between a transmitter antenna array and a receiver antenna array does not exceed a threshold (e.g., a preconfigured or predefined threshold), where the threshold may be based on the aperture of the transmitter antenna array and the receiver antenna array, and the carrier frequency. Additionally or alternatively, LSM may provide increased multiplexing gain when an accurate LSM precoder is established, where an LSM precoder may be based on channel knowledge at a transmitter and distance feedback. LSM may be deployed over a backhaul link between a network node (e.g., base station, integrated access and backhaul IAB), sidelink UE) and a relay node (e.g., an IAB, smart repeater, CPE, drone, sidelink UE, and/or over an access link between a network node (and/or relay node) and a UE.

In such cases, the transmitting device, the receiving device, or both may simplify the channel matrix calculation. For example, the NLoS parameter may be ignored and the distance between the centers of the two antenna arrays may be used in the channel matrix calculation (e.g., the antenna array of the transmitting device and the antenna array of the receiving device), rather than calculating the distance between each antenna element pair. For example, an LSM channel matrix may be calculated in accordance with Equation 3, for a constant K.

$$H \sim K \frac{\exp\left(-i2\pi \frac{d_{jk}}{\lambda}\right)}{r_{jk}/\lambda} \quad (3)$$

$d_{jk}$ may refer to the distance between the centers of the receiver and transmitter arrays.

However, in accordance with some methods, if there is any misalignment between the two antenna arrays (e.g., rotational misalignment, translational misalignment), the devices may not use such simplifications. For example, one or both of the antenna arrays may shift along the x and/or y axis (e.g., parallel shift, translation misalignment), as described in more detail with reference to FIG. 3 and/or one or both of the antenna arrays may rotate around the z axis (e.g., rotational misalignment), as described in more detail with reference to FIG. 4. In such cases, the channel matrix, precoder matrix and post-processing matrix may be updated, without simplifications, resulting in a heavy computational requirement. For example, rather than calculating the channel matrix using the distance between the center of the receiving antenna array and the transmitting antenna array, the channel matrix would instead be calculated for each antenna element pair between the receiving antenna array and the transmitting antenna array.

To improve methods of calculating a channel matrix, a precoding matrix, a post-processing matrix, or a combination thereof between at least two devices, a receiving device, a transmitting device, or both may be configured to identify misalignment (e.g., rotational misalignment, translational misalignment) between the wireless devices 210. For example, the transmitting device, the receiving device, or both may identify a misalignment vector, Δ, and/or a rotation angle, θ, and rotation vector (e.g., a translational misalignment metric, a rotational misalignment metric, or both) and use the misalignment vector and/or rotation angle and vector to update the channel matrix, the precoder matrix, the post-processing matrix, or a combination thereof. In some cases, each wireless device 210 may individually determine the misalignment vector and/or rotational angle and vector. In some cases, one of the wireless devices 210 may determine the misalignment vector and/or rotation angle and vector and signal an indication of the misalignment vector and/or rotation angle and vector to the other wireless device 210. Calculating the channel matrix, the precoder matrix, the post-processing matrix, or a combination thereof based on the misalignment vector and/or rotation angle and vector may result in a simplified computation.

For example, wireless device 210-a and wireless device 210-b may be communicating over one or more communication links 215 (e.g., channels, beams). To communicate, wireless device 210-a may generate beams and/or receive signals using one or more antenna elements of antenna array 205-a, and similarly, wireless device 210-b may use antenna array 205-b to communicate with wireless device 210-a. Wireless device 210-a, wireless device 210-b, or a combination thereof may be configured to identify (and/or monitor) misalignment between antenna arrays 205-a and 205-b. For example, in some cases, the wireless devices 210 may identify any misalignment prior to communications, and/or throughout communications. A wireless device 210 may identify misalignment between antenna arrays 205-a and 205-b based on signals transmitted and received between wireless devices 210-a and 210-b. For example, wireless device 210-b may transmit one or more signals 220 (e.g., reference signals) to wireless device 210-a, which wireless device 210-a may use to identify the misalignment. Similarly, wireless device 210-a may transmit one or more signals 220 (e.g., reference signals) to wireless device 210-b for wireless device 210-b to identify the misalignment.

In some cases, one or both of the wireless devices 210 may determine that there is translational misalignment between antenna array 205-a and 205-b resulting in misalignment vector, Δ. For example, antenna array 205-b may be shifted downward in relation to antenna array 205-a such that the centers of the antenna arrays 205 do not line up. Additionally or alternatively, one or both of the wireless devices 210 may determine that there is rotational misalignment between antenna array 205-a and 205-b resulting in rotation angle, θ and a unit vector indicative of a direction of the rotational misalignment in 3D. In some cases, upon identifying the misalignment, wireless device 210-a may indicate the misalignment to wireless device 210-b, or a vice versa. In some cases, both wireless device 210 may individually determine the misalignment, without an indication from the other wireless device 210 of the misalignment. Wireless device 210-a, wireless device 210-b, or both may use the misalignment vector and/or the rotation angle and vector to update the channel matrix, the precoder matrix, the post-processing matrix, or a combination thereof. In some cases, the wireless device 210 may calculate the precoding matrix and/or the post-processing matrix based on the identified misalignment without first calculating the channel matrix.

It should be understood that while FIG. 2 depicts antenna array 205-a having the translational misalignment, the misalignment between multiple antenna arrays 205 may be a result of shift and/or rotation at wireless device 210-a, wireless device 210-b, or both.

Figure 3:
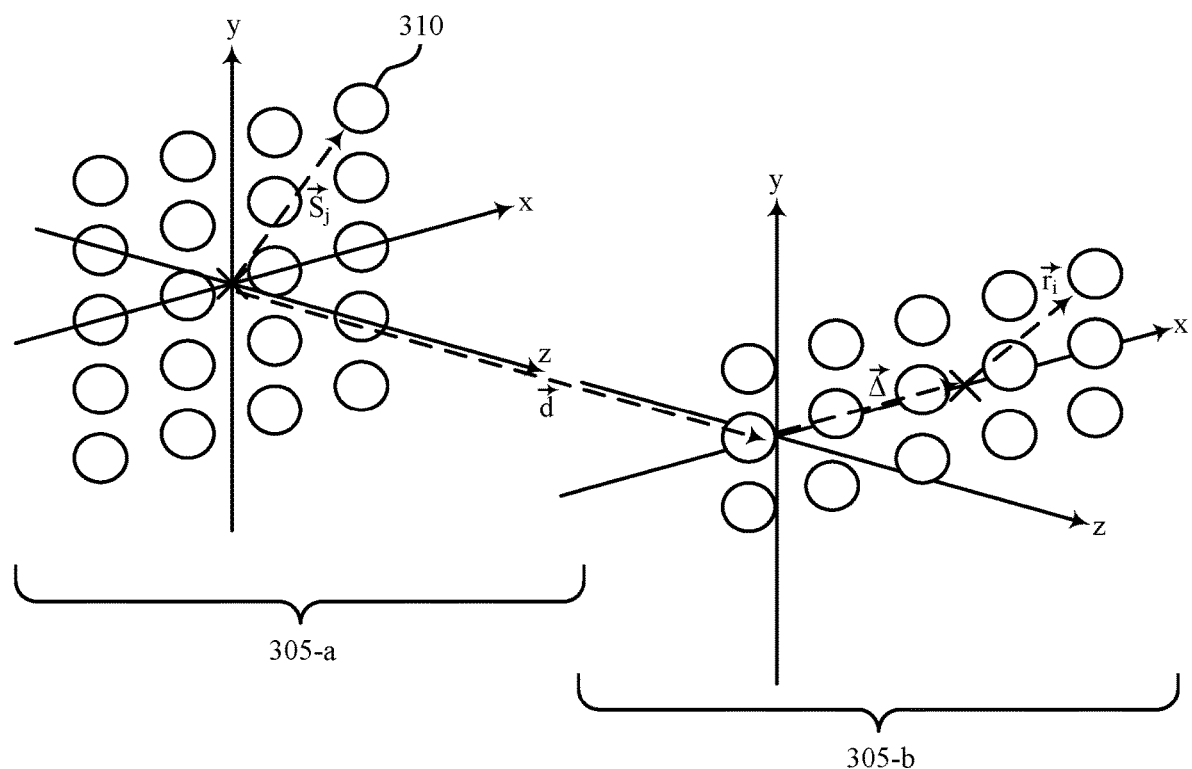

FIG. 3 illustrates an example of a wireless communications system 300 that supports techniques for estimating misalignment between multiple antenna arrays in accordance with aspects of the present disclosure. The wireless communications system 300 may include antenna arrays 305-a and 305-b, which may be antenna arrays 305 of corresponding wireless devices. Antenna array 305-a may be associated with a first wireless device and antenna array 305-b may be associated with a second wireless device. The wireless devices may be UEs, base stations, network nodes, etc., which may be examples of the corresponding devices as described with reference to FIGS. 1 and 2. The wireless devices may be the same type of device, or may be different types of devices. In some cases, one or both of wireless devices may implement a procedure for identifying misalignment between antenna arrays 305 of the wireless devices.

In some cases, multiple antenna arrays 305 (e.g., at least two antenna arrays 305 in communication with an another) may be aligned such that the centers of the multiple antenna arrays may align with one another and the antenna arrays 305 are facing one another. However, in some other cases and as described with reference to FIG. 2, multiple antenna arrays 305 may be misaligned compared to one another. In the case of translational misalignment (e.g., parallel shift), one of the antenna arrays 305 may be shifted along the x and/or y-axis compared to another antenna array 305. For example, the center of antenna array 305-a may coincide with the intersection of the x, y, and z-axis but the center the antenna array 305-b may located along the x-axis such that the center of antenna array 305-a and 305-b do not align with one another.

In such cases, the receiving device and/or the transmitting device may estimate the misalignment vector, Δ. For example, one or both of the devices may identify the misalignment vector based on signals (e.g., reference signals, control signals, data signals) received by the other device. In some cases, the receiving device may transmit an indication of the misalignment vector to the transmitting device, or vice versa. In some cases, the receiving device may indicate the misalignment vector to the transmitting device in a feedback message (e.g., feedback report).

In some implementations, the receiving device, the transmitting device, or both may use the feedback vector to calculate the channel matrix, H, such as in accordance with Equation 4. In some cases, the receiving device and the transmitting device may individually calculate the channel matrix. In some other cases, the receiving device may calculate the channel matrix and indicate the channel matrix to the transmitting device, or vice versa.

$$H_{ij}^{new} = H_{ij} e^{-j \frac{2\pi \left( \left( \vec{d} + \vec{r_i} - \vec{s_j} \right) \vec{\Delta} \right)}{\lambda \left\| \left( \vec{d} + \vec{r_i} - \vec{s_j} \right) \right\|}} \quad (4)$$

$\vec{\Delta}$ may refer to the translational misalignment vector in 3D, $\vec{d}$ may refer to a distance vector between antenna arrays 305-a and 305-b (when the centers of the antenna arrays are aligned), $\vec{s}_j$ may refer to a location vector of the j'th transmitter antenna element from the center of the transmitting antenna array 305, and $\vec{r}_i$ may refer to a location vector of the i'th receiving antenna element from the center of the receiving antenna array 305. $H_{ij}$ may refer to a previously calculated channel matrix and Equation 4 may be used to calculate $H_{ij}^{new}$ for i=1, 2, ..., M and j=1, 2, ..., N. For example, the devices may use the misalignment vector to update the channel matrix (M×N) for N transmitting antenna elements and M receiving antenna elements.

Upon calculating the channel matrix, $H_{ij}^{new}$, the transmitting device may calculate a precoder, $V^{new}$, by taking SVD of $H_{ij}^{new}$. Similarly, the receiving device may calculate a precoder, $U^{new}$, by taking SVD of $H_{ij}^{new}$. The transmitting device and/or the receiving device may implement such techniques for calculating $V^{new}$, $U^{new}$ and $H_{ij}^{new}$ for near field scenarios, or far-field scenarios. In some cases, such techniques may be implemented as a default.

In some implementations, upon identifying the misalignment vector, the transmitting device may use the misalignment vector to update the precoder matrix V (N×N) for N transmitting antenna elements 310 (of antenna array 305-a, or 305-b). in accordance with Equation 5 and the receiving device may use the misalignment vector to update the post-processing matrix, U (M×M) for M receiving antenna elements 310 (of antenna array 305-a, or 305-b) in accordance with Equation 6.

$$V_{ij}^{new} = V_{ij} e^{-j\frac{2\pi(\vec{s}_j \cdot \vec{\Delta})}{\lambda \|\vec{d}\|}} \quad (5)$$

for i, j, =1, 2, ..., N.

$$U_{ij}^{new} = U_{ij} e^{-j\frac{2\pi(\vec{r}_i \cdot \vec{\Delta})}{\lambda \|\vec{d}\|}} \quad (6)$$

for i, j, =1, 2, ..., M.

Accordingly, the transmitting device and the receiving device may update the precoder matrix and the post-processing matrix without first updating the channel matrix, H. In some cases, the transmitting device, the receiving device, or both may implement such techniques to calculate the precoder matrix and the post-processing matrix in accordance with Equations 5 and 6 when antenna arrays 305-a and 305-b satisfy the conditions for a far-field scenario. With respect to far field approximation, both the precoder and post-processor may be updated according to the amount and/or type of misalignment. Additionally, the procedures described with reference to FIG. 3 for updating a channel matrix, precoding matrix, post-processing matrix, or a combination thereof based on translational misalignment may be combined with the procedures described with reference to FIG. 4 for updating a channel matrix, precoding matrix, post-processing matrix, or a combination thereof based on rotational misalignment.

Figure 4:
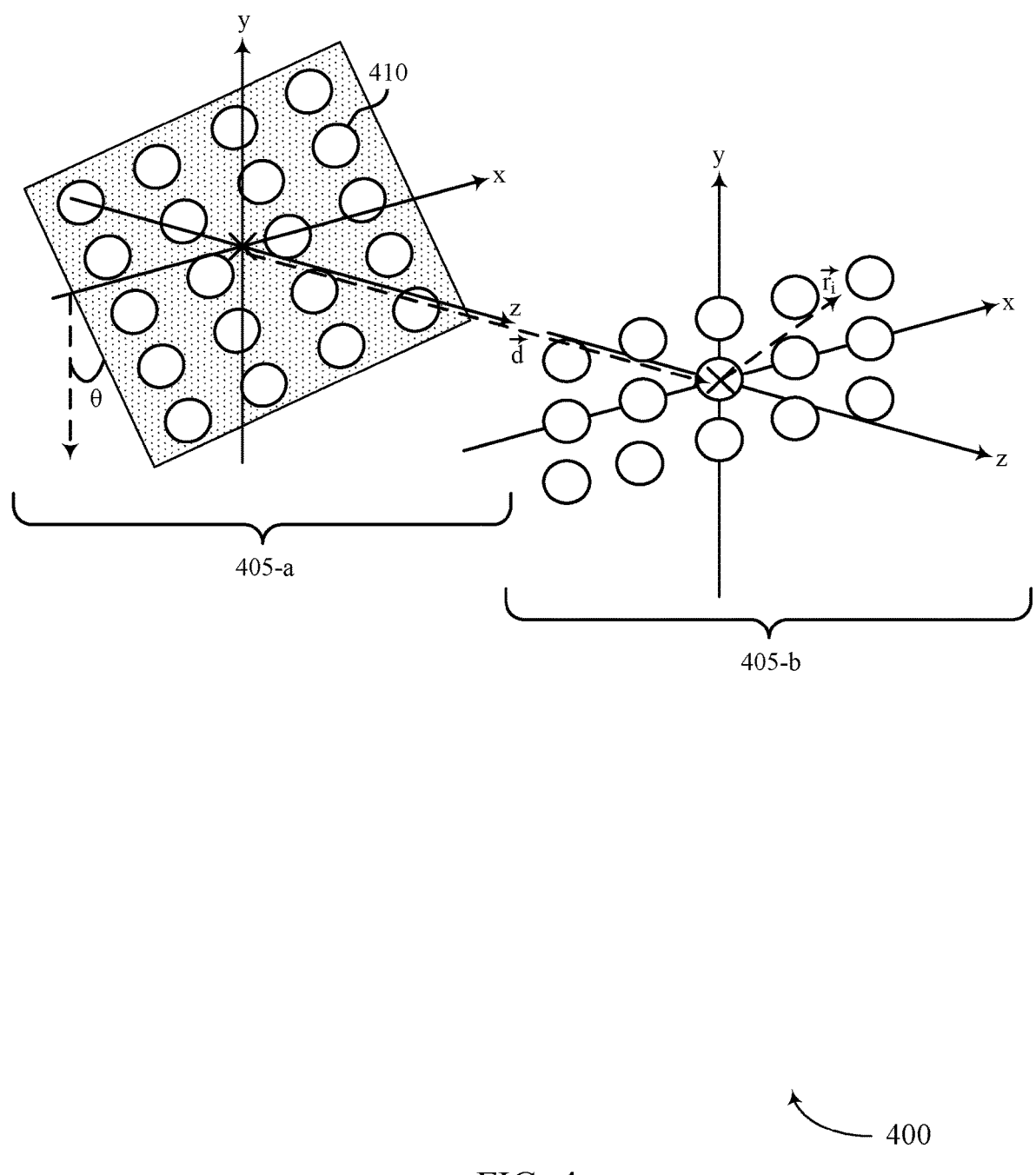

FIG. 4 illustrates an example of a wireless communications system 400 that supports techniques for estimating misalignment between multiple antenna arrays in accordance with aspects of the present disclosure. The wireless communications system 400 may include antenna arrays 405-a and 405-b, which may be antenna arrays 405 of corresponding wireless devices. Antenna array 405-a may be associated with a first wireless device and antenna array 405-b may be associated with a second wireless device. The wireless devices may be UEs, base stations, network nodes, etc., which may be examples of the corresponding devices as described with reference to FIGS. 1 through 3. The wireless devices may be the same type of device, or may be different types of devices. In some cases, one or both of wireless devices may implement a procedure for identifying misalignment between antenna arrays 405 of the wireless devices.

In some cases, multiple antenna arrays 405 (e.g., at least two antenna arrays 405 in communication with an another) may be aligned such that the centers of the multiple antenna arrays 405 may align with one another and face one another. However, in some other cases and as described with reference to FIGS. 2 and 3, antenna arrays 405 may be misaligned compared to one another. In the case of rotational misalignment, consider that two antenna arrays 405 (e.g., antenna arrays 405-a and 405-b) are currently communicating or are scheduled to communicate and further consider a coordinate system in-line with one of the two antenna arrays 405 such that the face of the antenna array 405 is perpendicular to the z-axis and is parallel with the x-axis and y-axis, as depicted by antenna array 405-b. Then, rotational misalignment occurs when the other antenna array 405, antenna array 405-a, is rotated around the x-axis, the y-axis, or a combination thereof with respect to antenna array 405-b. In some cases, both antenna arrays 405 may be rotated with respect to a coordinate system.

In some implementations, the amount of rotation of an antenna array 405 may be described by a unit vector, where the unit vector may be a vector in 3D over which the antenna array 405 is rotated. Accordingly, a rotation angle and unit vector may describe a rotation of an antenna array 405 (e.g., of a device associated with the antenna array 405). A unit vector of a transmitting device may be represented by $\vec{t}$, and a rotation angle of the transmitting device may be represented by θ (e.g., ∈ [0 2π]). Similarly, a unit vector of a receiving device may be represented by $\vec{u}$, and a rotation angle of the receiving device may be represented by φ (e.g., ∈ [0 2π]). For example, a transmitting device (e.g., an antenna array 405) may be rotated θ equal to π/4 around $\vec{t}$ =[1, 0, 0] (e.g., the x-axis). In another example, a receiving device (e.g., an antenna array 405) may be rotated φ equal to π/4 around $\vec{u}$=[1, 0, 0] (e.g., the x-axis).

In some implementations, the amount of rotation of an antenna array 405 may be described by a rotation matrix, where the rotation matrix may be based on an angle of rotation with respect to an x-axis, and angle of rotation with respect to a y-axis, or a combination thereof. In some cases, the rotation matrix may be determined in accordance with an order of rotation. For example, the angle of rotation around the x-axis (e.g., x-rotation) may be applied first, and then the angle of rotation around the y-axis (e.g., y-rotation) may be applied second. The x-axis and y-axis may be orthogonal to a z-axis which is in a direction of the communications between the transmitting device and the receiving device. Accordingly, the receiving device and/or the transmitting device may identify at least one of a first angle of rotation and a corresponding first unit vector, or a second angle of rotation with respect to an x-axis and a third angle of rotation with respect to a y-axis. The receiving device and/or the transmitting device may determine a rotation matrix based on either the first angle of rotation and the corresponding first unit vector or the second angle of rotation and, subsequently, the third angle of rotation.

The receiving device and/or the transmitting device may estimate the corresponding rotation amount. For example, a first device may estimate the rotation of the first device and the second device may estimate the rotation of the second device. In some implementations, the first device may transmit, to the second device, an indication of the rotation amount of the first device. Similarly, the second device may transmit, to the first device, an indication of the rotation amount of the second device. In some cases, the first and second device may refrain from exchanging rotation information. Whether the devices exchange rotation information with one another may be based on antenna arrays 405-$a$ and 405-$b$ satisfying far field conditions. For example, in a general scenario (e.g., a default scenario that may include near field and/or far field scenarios), the devices may exchange rotation information. In some cases, if the devices satisfy far-field conditions, the devices may refrain from exchanging rotation information.

In the case that the first device and second device exchange rotation information, the first device and the second device may both identify the rotation of the first device and the rotation of the second device. Rotation may refer to any amount of rotation in relation to a preconfigured (e.g., predefined, default, base) coordinate system. Based on the rotation information, one or both of the first device and second device may update a channel matrix.

For example, a transmitting device may estimate θ and $\vec{t}$ at the transmitter and may construct a matrix, $K_{\vec{t}}$, in accordance with Equation 7. Then, the transmitting device may calculate $R_{\theta,\vec{t}}$ in accordance with Equation 8. In some cases, upon calculating $R_{\theta,\vec{t}}$, the transmitting device may indicate $R_{\theta,\vec{t}}$ and/or $K_{\vec{t}}$ to the receiving device.

$$K_{\vec{t}} = \begin{bmatrix} 0 & -\vec{t}(3) & \vec{t}(2) \\ \vec{t}(3) & 0 & -\vec{t}(1) \\ -\vec{t}(2) & \vec{t}(1) & 0 \end{bmatrix} \quad (7)$$

$$R_{\theta,\vec{t}} = I + \sin(\theta)K_{\vec{t}} + (1-\cos(\theta))K_{\vec{t}}^2 \quad (8)$$

Additionally or alternatively, a receiving device may estimate φ and $\vec{u}$ at the receiver and may construct a matrix, $K_{\vec{u}}$, in accordance with Equation 9. Then, the receiving device may calculate $R_{\varphi,\vec{u}}$, in accordance with Equation 10. In some cases, upon calculating $R_{\varphi,\vec{u}}$, the receiving device may indicate $R_{\varphi,\vec{u}}$ and/or $K_{\vec{u}}$ to the transmitting device.

$$K_{\vec{u}} = \begin{bmatrix} 0 & -\vec{u}(3) & \vec{u}(2) \\ \vec{u}(3) & 0 & -\vec{u}(1) \\ -\vec{u}(2) & \vec{u}(1) & 0 \end{bmatrix} \quad (9)$$

$$R_{\varphi,\vec{u}} = I + \sin(\varphi)K_{\vec{u}} + (1-\cos(\varphi))K_{\vec{u}}^2 \quad (10)$$

Accordingly, the transmitting device may identify the rotation information of the transmitting device (e.g., $R_{\theta,\vec{t}}$ and/or $K_{\vec{t}}$) and the rotation information of the receiving device (e.g., $R_{\varphi,\vec{u}}$ and/or $K_{\vec{u}}$) Additionally or alternatively, the receiving device may identify the rotation information of the receiving device (e.g., $R_{\varphi,\vec{u}}$ and/or $K_{\vec{u}}$) and the rotation information of the transmitting device (e.g., $R_{\theta,\vec{t}}$ and/or $K_{\vec{t}}$). The transmitting device and/or the receiving device may be configured to update the channel matrix, H, between the transmitting device and the receiving device using Equation 11.

$$H_{ij}^{new} = H_{ij} e^{-j\frac{2\pi\left(\vec{d}_{ij}^T\left(R_{\varphi,\vec{u}}-I\right)\vec{r}_i - \vec{d}_{ij}^T\left(R_{\theta,\vec{t}}-I\right)\vec{s}_j\right)}{\lambda\|\vec{d}_{ij}\|}} \quad (11)$$

for i=1, 2, ..., M and j=1, 2, ..., N. $\vec{d}$ may refer to the distance vector between the transmitting and receiving antenna arrays 405 when centers of the antenna arrays 405 are aligned. $\vec{s}_j$ may refer to a location vector of the j'th transmitting antenna element 410 from the center of the transmitting array when centers of the arrays are aligned. $\vec{r}_i$ may refer to a location vector of the i'th receiving antenna element 410 from the center of the receiving array when centers of the arrays are aligned. $\vec{d}_{ij}$ may be equal to a $\vec{d} + \vec{r}_i - \vec{s}_j$.

Upon calculating the channel matrix, $H_{ij}^{new}$, the transmitting device may calculate a precoder, $V^{new}$, by taking SVD of $H_{ij}^{new}$. Similarly, the receiving device may calculate a precoder, $U^{new}$, by taking SVD of $H_{ij}^{new}$ The transmitting device and/or the receiving device may implement such techniques for calculating $V^{new}$, $U^{new}$ and $H_{ij}^{new}$ for near field scenarios, or far-field scenarios. In some cases, such techniques may be implemented as a default.

In some scenarios, such as a far-field scenario, the transmitting device may estimate (e.g., locally estimate) the rotation angle and unit vector associated with the transmitting device. In some cases, the transmitting device may perform such estimation if the transmitting device determines that it is rotated. The transmitting device may construct a matrix, $K_{\vec{t}}$, in accordance with Equation 7, and calculate $R_{\theta,\vec{t}}$ in accordance with Equation 8. Based on $K_{\vec{t}}$ and $R_{\theta,\vec{t}}$, the transmitting device may update the precoder matrix, V, in accordance with Equation 12 (e.g., without first updating the channel matrix, H).

$$V_{ij} = V_{ij} e^{-j\frac{2\pi\left(\vec{d}^T\left(R_{\theta,\vec{t}}-I\right)\vec{s}_j\right)}{\lambda\|\vec{d}\|}} \quad (12)$$

for i, j, =1, 2, ..., N, where N is the number of transmitting antenna elements 410 of the transmitting antenna array 405.

Additionally or alternatively, the receiving device may estimate (e.g., locally estimate) the rotation angle and unit vector associated with the receiving device. In some cases, the receiving device may perform such estimation if the receiving device determines that it is rotated. The receiving device may construct a matrix, $K_{\vec{u}}$, in accordance with Equation 9, and calculate $R_{\varphi,\vec{u}}$ in accordance with Equation 10. Based on $K_{\vec{u}}$ and $R_{\varphi,\vec{u}}$, the receiving device may update the precoder matrix, U in accordance with Equation 13 (e.g., without first updating the channel matrix, H).

$$U_{ij} = U_{ij} e^{-j\frac{2\pi\left(\vec{d}^T\left(R_{\varphi,\vec{u}}-I\right)\vec{r}_i\right)}{\lambda\|\vec{d}\|}} \quad (13)$$

for i, j, =1, 2, . . . , M, where M is the number of receiving antenna elements 410 of the receiving antenna array 405. Accordingly, the transmitting device and the receiving device may update the precoding matrix, V, and the post-processing matrix, U, respectively based on the respect rotation of each device and in some cases, without signaling rotation information to one another and/or without updating the channel matrix, H. In some implementations, updating the channel matrix, the precoding matrix, the post-processing matrix, or a combination thereof may be on a determined rotation matrix.

Transmitting device and receiving device are described throughout, however, it should be understood that the terms are interchangeable such that a transmitting device may also be a receiving device and may perform the procedures described herein that relate to a receiving device. Similarly, a receiving device described herein may also be a transmitting device and may perform the procedures described herein that relate to a transmitting device. Additionally, the procedures described with reference to FIG. 4 for updating a channel matrix, precoding matrix, post-processing matrix, or a combination thereof based on rotational misalignment may be combined with the procedures described with reference to FIG. 3 for updating a channel matrix, precoding matrix, post-processing matrix, or a combination thereof based on translational misalignment.

Figure 5:
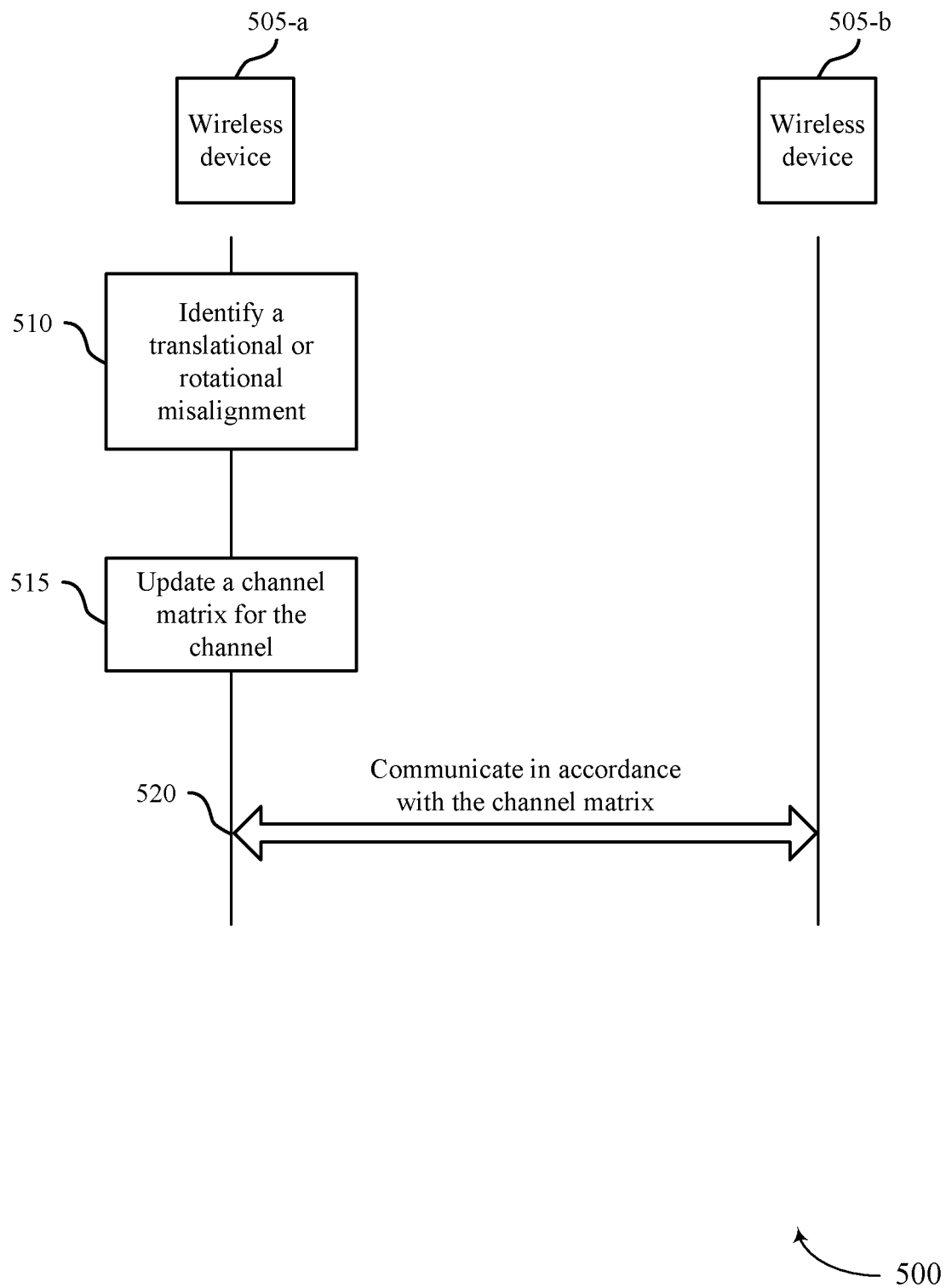
FIG. 5 illustrates an example of a process flow that supports techniques for estimating misalignment between multiple antenna arrays in accordance with aspects of the present disclosure.

FIG. 5 illustrates an example of a process flow 500 that supports techniques for estimating misalignment between multiple antenna arrays in accordance with aspects of the present disclosure. The process flow 500 may illustrate an example procedure for identifying and compensating for misalignment between antenna arrays of wireless devices 505. For example, wireless device 505-*a*, wireless device 505-*b*, or both may perform a procedure for identifying misalignment (e.g., translational, rotational, or both) and updating a channel matrix, precoding matrix, post-processing matrix, or a combination thereof based on the misalignment. Wireless device 505-*a* and 505-*b* may be examples of the corresponding wireless devices described with reference to FIGS. 1 through 4. Wireless device 505-*a* and 505-*b* may the same type or different types of device, where a type of device may refer to a UE, a base station, an IAB, a network node, etc. Alternative examples of the following may be implemented, where some steps are performed in a different order than described or are not performed at all. In some cases, steps may include additional features not mentioned below, or further steps may be added.

At 510, wireless device 505-*a* may identify a translational or rotational misalignment between a first antenna array of wireless device 505-*a* and a second antenna array of wireless device 505-*b* that is in LoS wireless communication with wireless device 505-*a* via a channel. In some cases, wireless device 505-*a* may identify a misalignment vector based on the translational or rotational misalignment between the first antenna array of wireless device 505-*a* and the second antenna array of wireless device 505-*b*. In some cases, wireless device 505-*a* may identify, for the first antenna array and based at least in part on the translational or rotational misalignment between the first antenna array of wireless device 505-*a* and the second antenna array of wireless device 505-*b*, at least one of a first angle of rotation and a corresponding first unit vector, or a second angle of rotation with respect to an x-axis and a third angle of rotation with respect to a y-axis. The x-axis and y-axis may be orthogonal to a z-axis which is in a direction of the communications. The wireless device 505-*a* may determine a rotation matrix based on either the first angle of rotation and the corresponding first unit vector or the second angle of rotation and, subsequently, the third angle of rotation.

Identifying the translational or rotational misalignment between the first antenna array of wireless device 505-*a* and the second antenna array of wireless device 505-*b* may include receiving, from wireless device 505-*b*, an indication of the translational or rotational misalignment between the first antenna array and the second antenna array. Additionally or alternatively, wireless device 505-*a* may transmit, to wireless device 505-*b*, an indication of the translational or rotational misalignment between the first antenna array and the second antenna array.

Identifying the translational or rotational misalignment between the first antenna array of wireless device 505-*a* and the second antenna array of wireless device 505-*b* may include identifying that the translational or rotational misalignment is a translational misalignment where the first antenna array is shifted along an x-axis, a y-axis, or a combination thereof with respect to the second antenna array. In some cases, identifying the translational or rotational misalignment between the first antenna array of wireless device 505-*a* and the second antenna array of wireless device 505-*b* may include identifying that the translational or rotational misalignment is a rotational misalignment where the first antenna array is rotated around an x-axis, a y-axis, or a combination thereof with respect to the second antenna array.

In some cases, wireless device 505-*a* may receive one or more signals from wireless device 505-*b*, where identifying the translational or rotational misalignment may be based on receiving the one or more signals. The one or more signals may be reference signals (e.g., downlink reference signals, uplink reference signals), control signals, data signals, etc.

At 515, wireless device 505-*a* may update a channel matrix for the channel based on the translational or rotational misalignment, where the channel matrix may be updated with one or more beam steering metrics of the first antenna array so as to improve a beam alignment between the first antenna array and the second antenna array. The beam steering metrics may account for misalignment between antenna arrays of the wireless device 505-*a* and wireless device 505-*b*. Accordingly, updating the channel matrix, the precoding matrix, the post-processing matrix, or a combination thereof based on the beam steering metrics may improve alignment between the antenna arrays of the wireless device 505-*a* and wireless device 505-*b*.

In some implementations, updating the channel matrix may include multiplying a previous channel matrix by a phase component, where the phase component may be based on a misalignment vector, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

In some implementations, updating the channel matrix may include multiplying a previous channel matrix by a phase component, where the phase component may be based on one or more first unit vectors and one or more first angles of rotation associated with the first antenna array (e.g., one or more unit vectors and corresponding angles of rotation indicative of a rotational misalignment around the x-axis, the y-axis, or a combination thereof), one or more second unit vectors and one or more second angles of rotation associated with the second antenna array (e.g., one or more unit vectors and corresponding angles of rotation indicative of a rotational misalignment around the x-axis, the y-axis, or a combination thereof), a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

In some cases, wireless device 505-*a* may calculate a precoding matrix by applying SVD to the channel matrix, where the one or more beam steering metrics may be associated with the precoding matrix. In some cases, wireless device 505-*a* may calculate a post-processing matrix by applying SVD to the channel matrix, where the one or more beam steering metrics may be associated with the post-processing matrix.

In some cases, updating the channel matrix may include updating a precoding matrix by multiplying a previous precoding matrix by a phase component. The phase component may be based on a misalignment vector, a first location vector indicative of a location of an antenna element of the first antenna array with respect to a center of the first antenna array, and a distance vector indicative of a distance between the first antenna array and the second antenna array. The phase component may be based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

In some cases, updating the channel matrix may include updating a post-processing matrix by multiplying a previous post-processing matrix by a phase component. The phase component may be based on a misalignment vector, a first location vector indicative of a location of an antenna element of the first antenna array with respect to a center of the first antenna array, and a distance vector indicative of a distance between the first antenna array and the second antenna array. The phase component may be based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

Updating the channel matrix may be based on the first antenna array being in a far field region with respect to the second antenna array.

At 520, wireless device 505-*a* may communicate with wireless device 505-*b* in accordance with the updated channel matrix.

Figure 6:
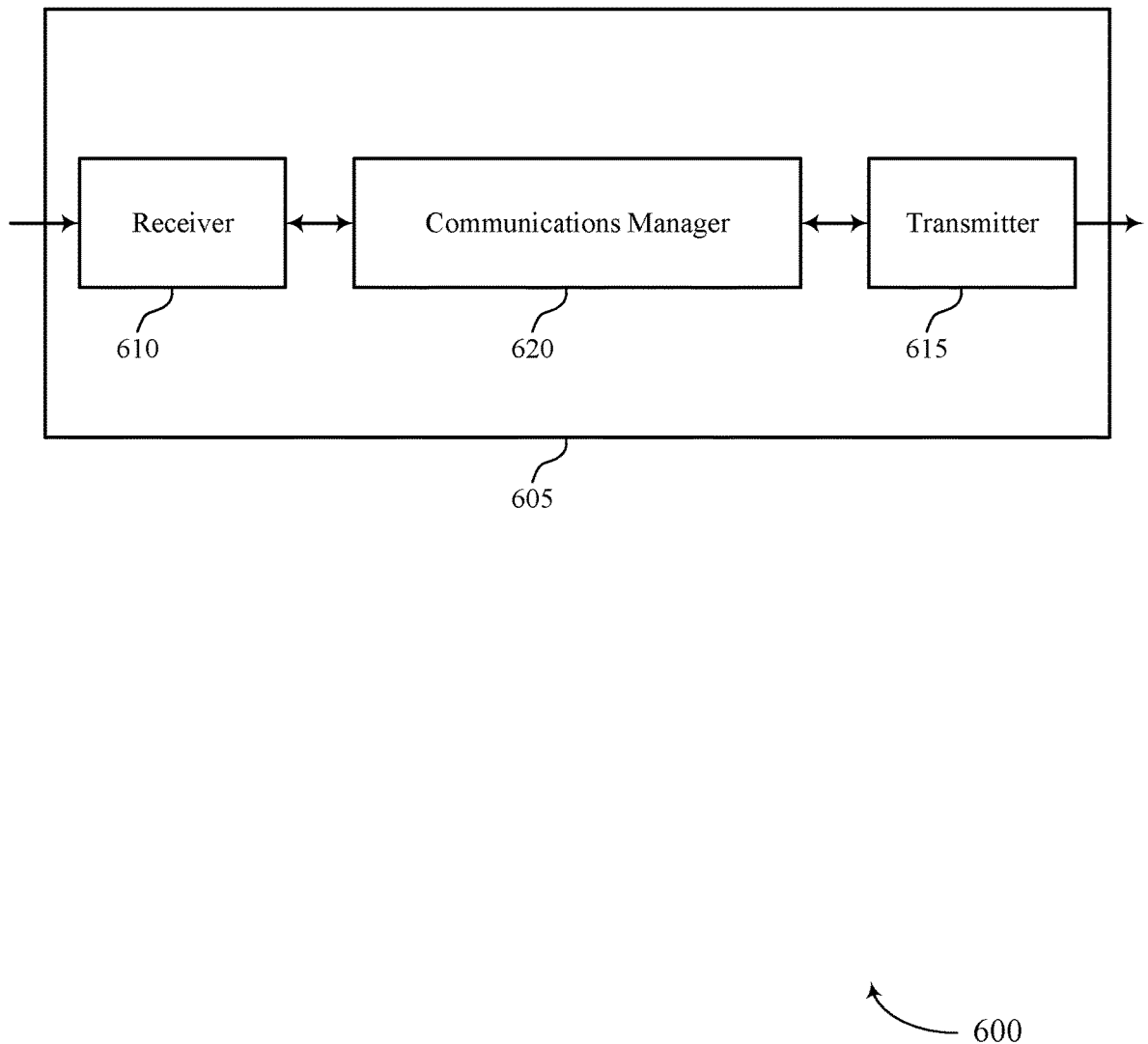
FIGS. 6 and 7 show block diagrams of devices that support techniques for estimating misalignment between multiple antenna arrays in accordance with aspects of the present disclosure.

FIG. 6 shows a block diagram 600 of a device 605 that supports techniques for estimating misalignment between multiple antenna arrays in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for estimating misalignment between multiple antenna arrays). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for estimating misalignment between multiple antenna arrays). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for estimating misalignment between multiple antenna arrays as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for identifying a translational or rotational misalignment between a first antenna array of the first wireless device and a second antenna array of a second wireless device that is in line-of-sight wireless communication with the first wireless device via a channel. The communications manager 620 may be configured as or otherwise support a means for updating a channel matrix for the channel based on the translational or rotational misalignment, the channel matrix updated with one or more beam steering metrics of the first antenna array so as to improve a beam alignment between the first antenna array and the second antenna array. The communications manager 620 may be configured as or otherwise support a means for communicating with the second wireless device in accordance with the updated channel matrix.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, and reduced power consumption.

Figure 7:
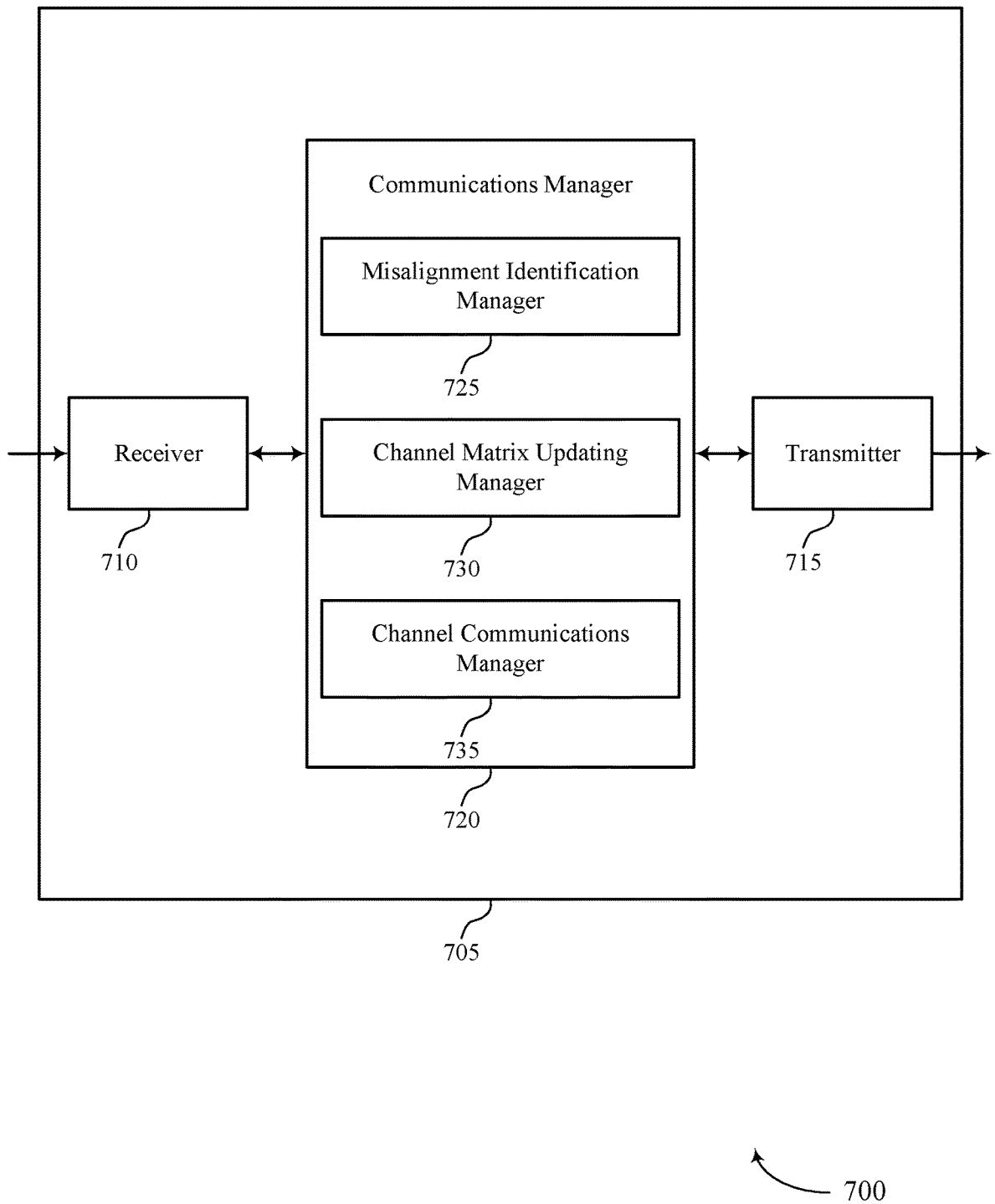

FIG. 7 shows a block diagram 700 of a device 705 that supports techniques for estimating misalignment between multiple antenna arrays in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for estimating misalignment between multiple antenna arrays). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for estimating misalignment between multiple antenna arrays). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for estimating misalignment between multiple antenna arrays as described herein. For example, the communications manager 720 may include a misalignment identification manager 725, a channel matrix updating manager 730, a channel communications manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The misalignment identification manager 725 may be configured as or otherwise support a means for identifying a translational or rotational misalignment between a first antenna array of the first wireless device and a second antenna array of a second wireless device that is in line-of-sight wireless communication with the first wireless device via a channel. The channel matrix updating manager 730 may be configured as or otherwise support a means for updating a channel matrix for the channel based on the translational or rotational misalignment, the channel matrix updated with one or more beam steering metrics of the first antenna array so as to improve a beam alignment between the first antenna array and the second antenna array. The channel communications manager 735 may be configured as or otherwise support a means for communicating with the second wireless device in accordance with the updated channel matrix.

Figure 8:
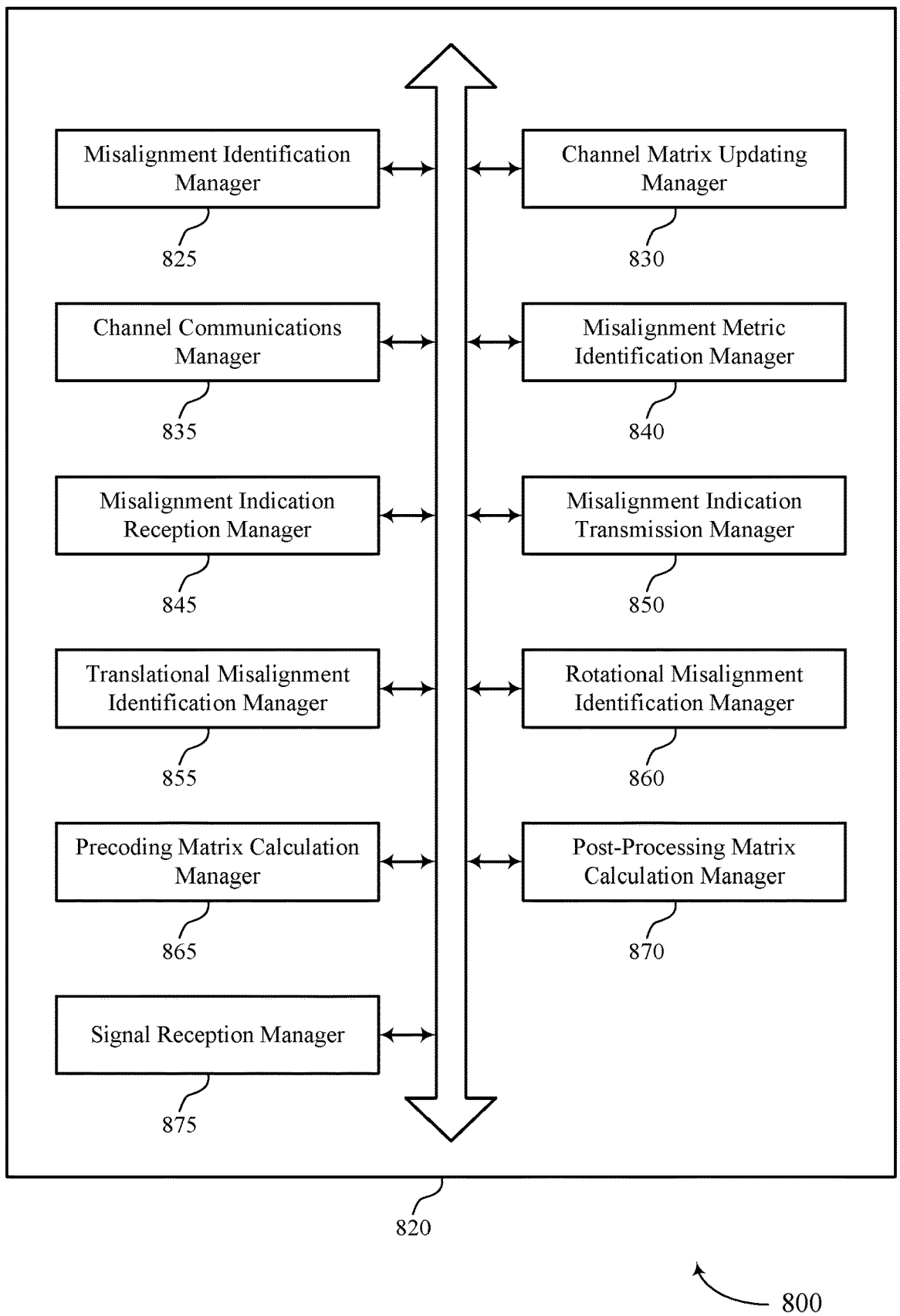
FIG. 8 shows a block diagram of a communications manager that supports techniques for estimating misalignment between multiple antenna arrays in accordance with aspects of the present disclosure.

FIG. 8 shows a block diagram 800 of a communications manager 820 that supports techniques for estimating misalignment between multiple antenna arrays in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for estimating misalignment between multiple antenna arrays as described herein. For example, the communications manager 820 may include a misalignment identification manager 825, a channel matrix updating manager 830, a channel communications manager 835, a misalignment metric identification manager 840, a misalignment indication reception manager 845, a misalignment indication transmission manager 850, a translational misalignment identification manager 855, a rotational misalignment identification manager 860, a precoding matrix calculation manager 865, a post-processing matrix calculation manager 870, a signal reception manager 875, or any combination thereof. Each of these components may communicate, directly or indirectly, with one another (e.g., via one or more buses).

The communications manager 820 may support wireless communications at a first wireless device in accordance with examples as disclosed herein. The misalignment identification manager 825 may be configured as or otherwise support a means for identifying a translational or rotational misalignment between a first antenna array of the first wireless device and a second antenna array of a second wireless device that is in line-of-sight wireless communication with the first wireless device via a channel. The channel matrix updating manager 830 may be configured as or otherwise support a means for updating a channel matrix for the channel based on the translational or rotational misalignment, the channel matrix updated with one or more beam steering metrics of the first antenna array so as to improve a beam alignment between the first antenna array and the second antenna array. The channel communications manager 835 may be configured as or otherwise support a means for communicating with the second wireless device in accordance with the updated channel matrix.

In some examples, the misalignment metric identification manager 840 may be configured as or otherwise support a means for identifying a misalignment vector based on the translational or rotational misalignment between the first antenna array of the first wireless device and the second antenna array of the second wireless device.

In some examples, the misalignment metric identification manager 840 may be configured as or otherwise support a means for identifying, for the first antenna array and based at least in part on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, wherein the x-axis and y-axis are orthogonal to a z-axis which is in a direction of the communications. The channel matrix updating manager 830 may be configured as or otherwise support a means for determining a rotation matrix based at least in part on either the first angle of rotation and the corresponding first unit vector or the second angle of rotation and, subsequently, the third angle of rotation.

In some examples, to support identifying the translational or rotational misalignment between the first antenna array of the first wireless device and the second antenna array of the second wireless device, the misalignment indication reception manager 845 may be configured as or otherwise support a means for receiving, from the second wireless device, an indication of the translational or rotational misalignment between the first antenna array and the second antenna array.

In some examples, the misalignment indication transmission manager 850 may be configured as or otherwise support a means for transmitting, to the second wireless device, an indication of the translational or rotational misalignment between the first antenna array and the second antenna array.

In some examples, to support identifying the translational or rotational misalignment between the first antenna array of the first wireless device and the second antenna array of the second wireless device, the translational misalignment identification manager 855 may be configured as or otherwise support a means for identifying that the translational or rotational misalignment is a translational misalignment where the first antenna array is shifted along an x-axis, a y-axis, or a combination thereof with respect to the second antenna array, wherein the x-axis and y-axis are orthogonal to a z-axis which is in a direction of the communications.

In some examples, to support identifying the translational or rotational misalignment between the first antenna array of the first wireless device and the second antenna array of the second wireless device, the rotational misalignment identification manager 860 may be configured as or otherwise support a means for identifying that the translational or rotational misalignment is a rotational misalignment where the first antenna array is rotated around an x-axis, a y-axis, or a combination thereof with respect to the second antenna array, wherein the x-axis and y-axis are orthogonal to a z-axis which is in a direction of the communications.

In some examples, to support updating the channel matrix, the channel matrix updating manager 830 may be configured as or otherwise support a means for updating the channel matrix by multiplying a previous channel matrix by a phase component, where the phase component is based on a misalignment vector, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

In some examples, to support updating the channel matrix, the channel matrix updating manager 830 may be configured as or otherwise support a means for updating the channel matrix by multiplying a previous channel matrix by a phase component, where the phase component is based on one or more first unit vectors and one or more first angles of rotation associated with the first antenna array, one or more second unit vectors and one or more second angles of rotation associated with the second antenna array, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

In some examples, the precoding matrix calculation manager 865 may be configured as or otherwise support a means for calculating a precoding matrix by applying singular value decomposition to the channel matrix, where the one or more beam steering metrics are associated with the precoding matrix.

In some examples, the post-processing matrix calculation manager 870 may be configured as or otherwise support a means for calculating a post-processing matrix by applying singular value decomposition to the channel matrix, where the one or more beam steering metrics are associated with the post-processing matrix.

In some examples, to support updating the channel matrix, the channel matrix updating manager 830 may be configured as or otherwise support a means for updating a precoding matrix by multiplying a previous precoding matrix by a phase component.

In some examples, the phase component is based on a misalignment vector, a first location vector indicative of a location of an antenna element of the first antenna array with respect to a center of the first antenna array, and a distance vector indicative of a distance between the first antenna array and the second antenna array.

In some examples, the phase component is based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

In some examples, to support updating the channel matrix, the channel matrix updating manager 830 may be configured as or otherwise support a means for updating a post-processing matrix by multiplying a previous post-processing matrix by a phase component.

In some examples, the phase component is based on a misalignment vector, a first location vector indicative of a location of an antenna element of the first antenna array with respect to a center of the first antenna array, and a distance vector indicative of a distance between the first antenna array and the second antenna array.

In some examples, the phase component is based on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

In some examples, the signal reception manager 875 may be configured as or otherwise support a means for receiving one or more signals from the second wireless device, where identifying the translational or rotational misalignment is based on receiving the one or more signals, the one or more signals being reference signals.

In some examples, updating the channel matrix is based on the first antenna array being in a far field region with respect to the second antenna array.

In some examples, the first wireless device is a UE and the second wireless device is a base station. In some examples, the first wireless device is a base station and the second wireless device is a UE.

Figure 9:
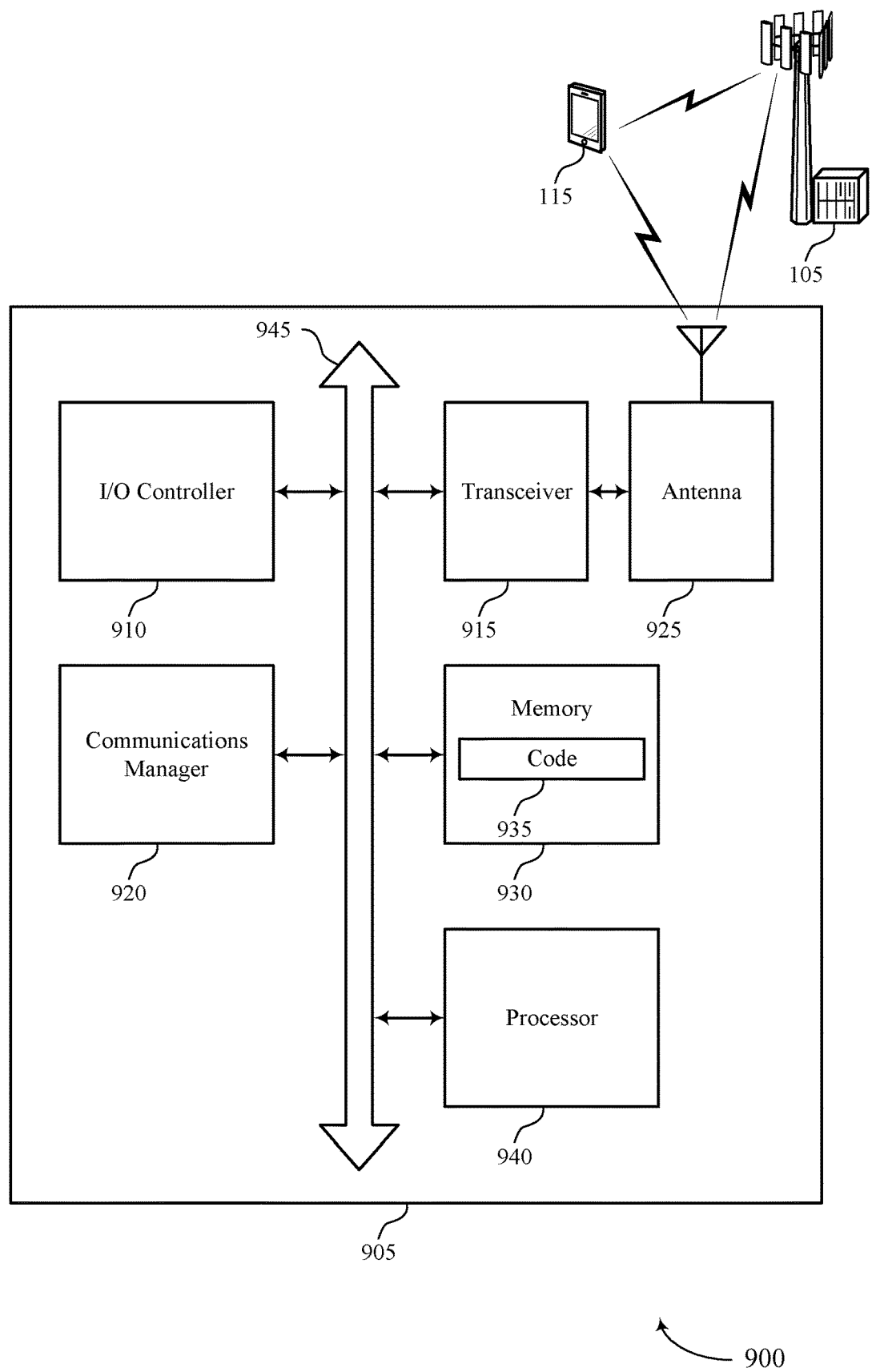
FIG. 9 shows a diagram of a system including a device that supports techniques for estimating misalignment between multiple antenna arrays in accordance with aspects of the present disclosure.

FIG. 9 shows a diagram of a system 900 including a device 905 that supports techniques for estimating misalignment between multiple antenna arrays in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for estimating misalignment between multiple antenna arrays). For example, the device 905 or a component of the device 905 may include a processor 940 and memory 930 coupled with or to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for identifying a translational or rotational misalignment between a first antenna array of the first wireless device and a second antenna array of a second wireless device that is in line-of-sight wireless communication with the first wireless device via a channel. The communications manager 920 may be configured as or otherwise support a means for updating a channel matrix for the channel based on the translational or rotational misalignment, the channel matrix updated with one or more beam steering metrics of the first antenna array so as to improve a beam alignment between the first antenna array and the second antenna array. The communications manager 920 may be configured as or otherwise support a means for communicating with the second wireless device in accordance with the updated channel matrix.

By including or configuring the communications manager 920 in accordance with examples as described herein, the device 905 may support techniques for improved communication reliability, reduced latency, improved user experience related to reduced processing, and reduced power consumption.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for estimating misalignment between multiple antenna arrays as described herein, or the processor 940 and the memory 930 may be otherwise configured to perform or support such operations.

Figure 10:
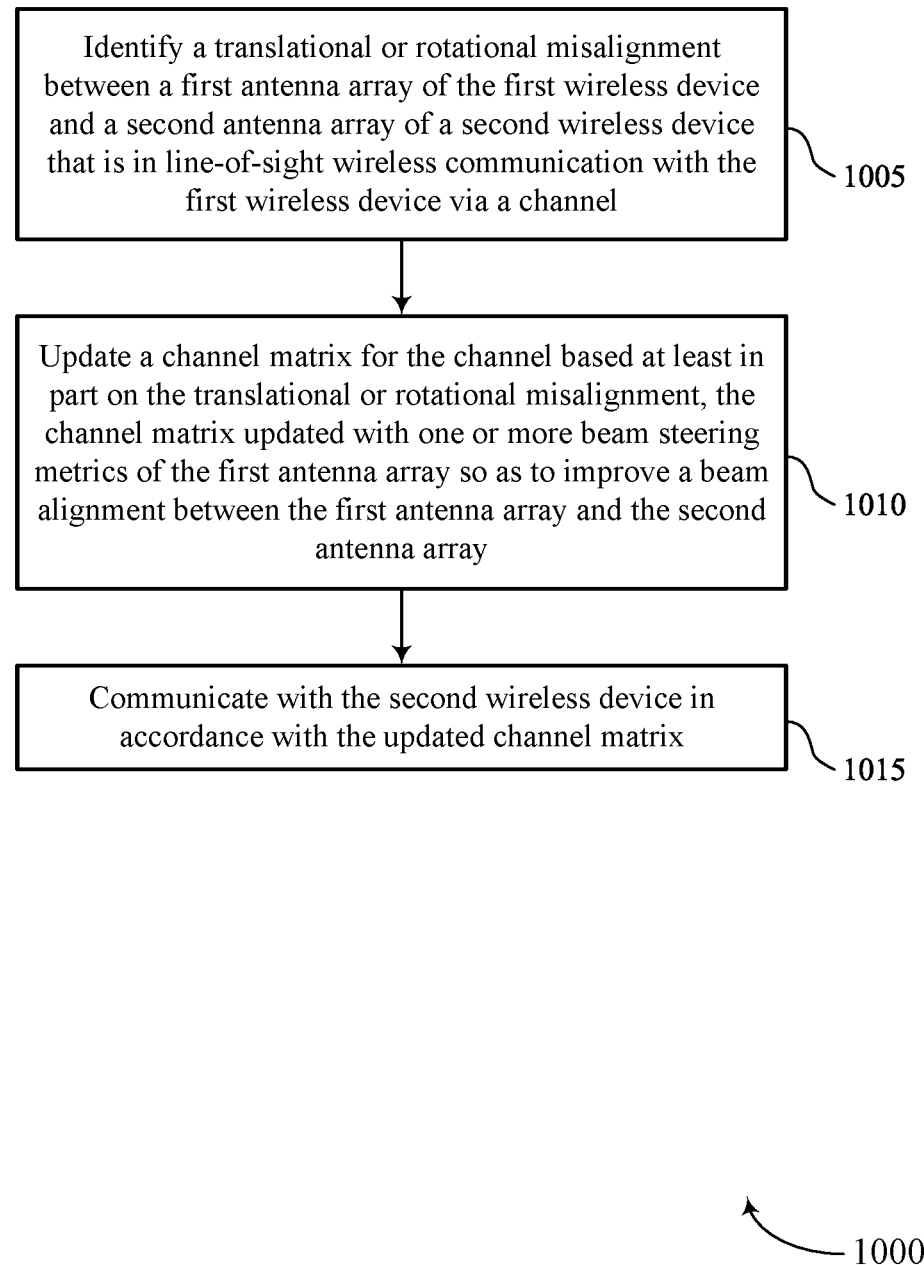
FIGS. 10 through 12 show flowcharts illustrating methods that support techniques for estimating misalignment between multiple antenna arrays in accordance with aspects of the present disclosure.

FIG. 10 shows a flowchart illustrating a method 1000 that supports techniques for estimating misalignment between multiple antenna arrays in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include identifying a translational or rotational misalignment between a first antenna array of the first wireless device and a second antenna array of a second wireless device that is in line-of-sight wireless communication with the first wireless device via a channel. The operations of 1005 may be performed in accordance with examples as disclosed herein. In some examples, aspects of the operations of 1005 may be performed by a misalignment identification manager 825 as described with reference to FIG. 8.

At 1010, the method may include updating a channel matrix for the channel based on the translational or rotational misalignment, the channel matrix updated with one or more beam steering metrics of the first antenna array so as to improve a beam alignment between the first antenna array and the second antenna array. The operations of 1010 may be performed in accordance with examples as disclosed herein. In some examples, aspects of the operations of 1010 may be performed by a channel matrix updating manager 830 as described with reference to FIG. 8.

At 1015, the method may include communicating with the second wireless device in accordance with the updated channel matrix. The operations of 1015 may be performed in accordance with examples as disclosed herein. In some examples, aspects of the operations of 1015 may be performed by a channel communications manager 835 as described with reference to FIG. 8.

Figure 11:
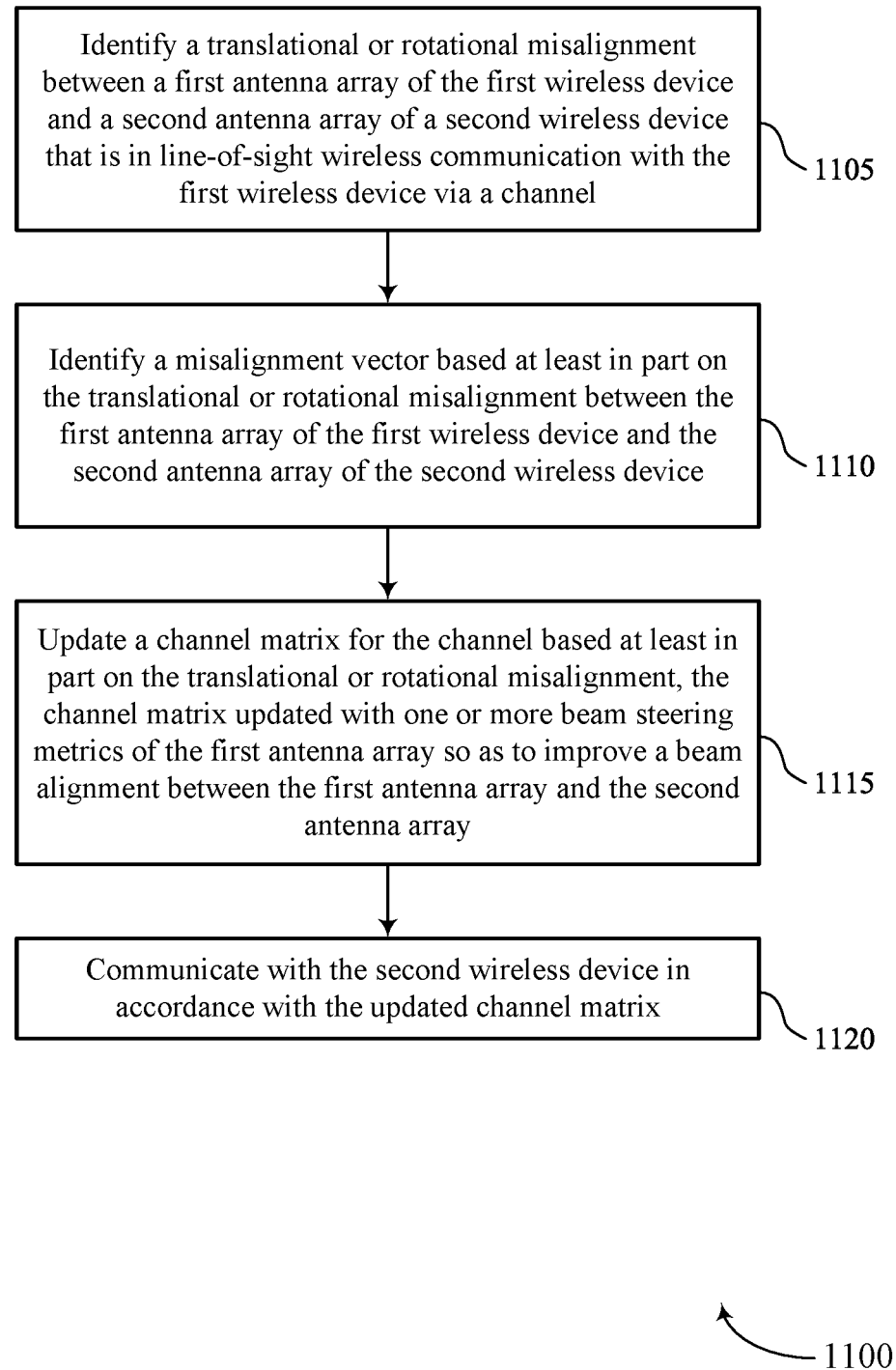

FIG. 11 shows a flowchart illustrating a method 1100 that supports techniques for estimating misalignment between multiple antenna arrays in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include identifying a translational or rotational misalignment between a first antenna array of the first wireless device and a second antenna array of a second wireless device that is in line-of-sight wireless communication with the first wireless device via a channel. The operations of 1105 may be performed in accordance with examples as disclosed herein. In some examples, aspects of the operations of 1105 may be performed by a misalignment identification manager 825 as described with reference to FIG. 8.

At 1110, the method may include identifying a misalignment vector based on the translational or rotational misalignment between the first antenna array of the first wireless device and the second antenna array of the second wireless device. The operations of 1110 may be performed in accordance with examples as disclosed herein. In some examples, aspects of the operations of 1110 may be performed by a misalignment metric identification manager 840 as described with reference to FIG. 8.

At 1115, the method may include updating a channel matrix for the channel based on the translational or rotational misalignment, the channel matrix updated with one or more beam steering metrics of the first antenna array so as to improve a beam alignment between the first antenna array and the second antenna array. The operations of 1115 may be performed in accordance with examples as disclosed herein. In some examples, aspects of the operations of 1115 may be performed by a channel matrix updating manager 830 as described with reference to FIG. 8.

At 1120, the method may include communicating with the second wireless device in accordance with the updated channel matrix. The operations of 1120 may be performed in accordance with examples as disclosed herein. In some examples, aspects of the operations of 1120 may be performed by a channel communications manager 835 as described with reference to FIG. 8.

Figure 12:
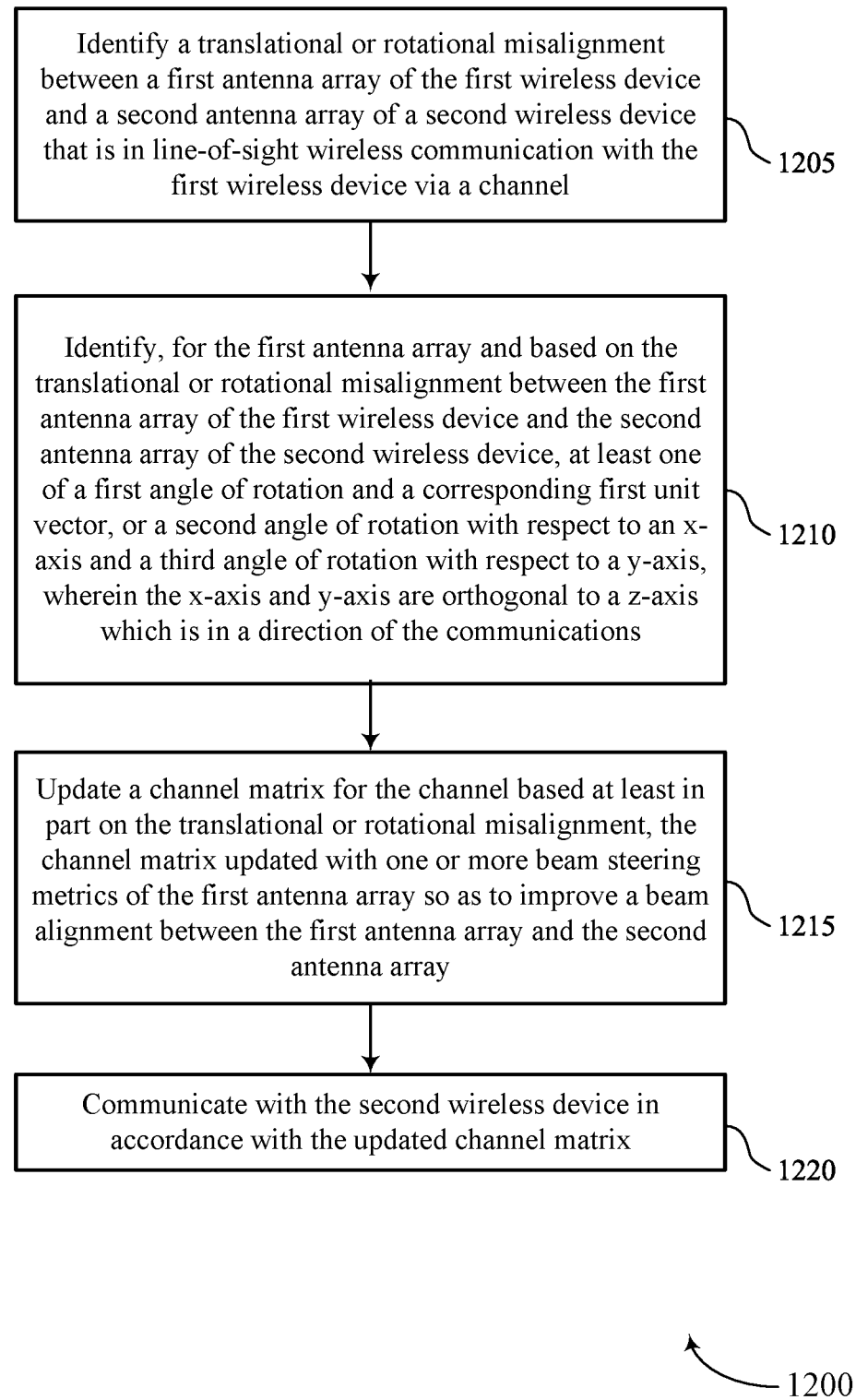

FIG. 12 shows a flowchart illustrating a method 1200 that supports techniques for estimating misalignment between multiple antenna arrays in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include identifying a translational or rotational misalignment between a first antenna array of the first wireless device and a second antenna array of a second wireless device that is in line-of-sight wireless communication with the first wireless device via a channel. The operations of 1205 may be performed in accordance with examples as disclosed herein. In some examples, aspects of the operations of 1205 may be performed by a misalignment identification manager 825 as described with reference to FIG. 8.

At 1210, the method may include identifying, for the first antenna array and based at least in part on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, wherein the x-axis and y-axis are orthogonal to a z-axis which is in a direction of the communications. The operations of 1210 may be performed in accordance with examples as disclosed herein. In some examples, aspects of the operations of 1210 may be performed by a misalignment metric identification manager 840 as described with reference to FIG. 8.

At 1215, the method may include updating a channel matrix for the channel based on the translational or rotational misalignment, the channel matrix updated with one or more beam steering metrics of the first antenna array so as to improve a beam alignment between the first antenna array and the second antenna array. The operations of 1215 may be performed in accordance with examples as disclosed herein. In some examples, aspects of the operations of 1215 may be performed by a channel matrix updating manager 830 as described with reference to FIG. 8.

At 1220, the method may include communicating with the second wireless device in accordance with the updated channel matrix. The operations of 1220 may be performed in accordance with examples as disclosed herein. In some examples, aspects of the operations of 1220 may be performed by a channel communications manager 835 as described with reference to FIG. 8.

The following provides an overview of aspects of the present disclosure:

Aspect 1: A method for wireless communications at a first wireless device, comprising: identifying a translational or rotational misalignment between a first antenna array of the first wireless device and a second antenna array of a second wireless device that is in line-of-sight wireless communication with the first wireless device via a channel; updating a channel matrix for the channel based at least in part on the translational or rotational misalignment, the channel matrix updated with one or more beam steering metrics of the first antenna array so as to improve a beam alignment between the first antenna array and the second antenna array; and communicating with the second wireless device in accordance with the updated channel matrix.

Aspect 2: The method of aspect 1, further comprising: identifying a misalignment vector based at least in part on the translational or rotational misalignment between the first antenna array of the first wireless device and the second antenna array of the second wireless device.

Aspect 3: The method of any of aspects 1 through 2, further comprising: identifying, for the first antenna array and based at least in part on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, wherein the x-axis and y-axis are orthogonal to a z-axis which is in a direction of the communications; and determining a rotation matrix based at least in part on either the first angle of rotation and the corresponding first unit vector or the second angle of rotation and, subsequently, the third angle of rotation.

Aspect 4: The method of any of aspects 1 through 3, wherein identifying the translational or rotational misalignment between the first antenna array of the first wireless device and the second antenna array of the second wireless device further comprises: receiving, from the second wireless device, an indication of the translational or rotational misalignment between the first antenna array and the second antenna array.

Aspect 5: The method of any of aspects 1 through 4, further comprising: transmitting, to the second wireless device, an indication of the translational or rotational misalignment between the first antenna array and the second antenna array.

Aspect 6: The method of any of aspects 1 through 5, wherein identifying the translational or rotational misalignment between the first antenna array of the first wireless device and the second antenna array of the second wireless device further comprises: identifying that the translational or rotational misalignment is a translational misalignment wherein the first antenna array is shifted along an x-axis, a y-axis, or a combination thereof with respect to the second antenna array, wherein the x-axis and y-axis are orthogonal to a z-axis which is in a direction of the communications.

Aspect 7: The method of any of aspects 1 through 6, wherein identifying the translational or rotational misalignment between the first antenna array of the first wireless device and the second antenna array of the second wireless device further comprises: identifying that the translational or rotational misalignment is a rotational misalignment wherein the first antenna array is rotated around an x-axis, a y-axis, or a combination thereof with respect to the second antenna array, wherein the x-axis and y-axis are orthogonal to a z-axis which is in a direction of the communications.

Aspect 8: The method of any of aspects 1 through 7, wherein updating the channel matrix further comprises: updating the channel matrix by multiplying a previous channel matrix by a phase component, wherein the phase component is based at least in part on a misalignment vector, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

Aspect 9: The method of any of aspects 1 through 8, wherein updating the channel matrix further comprises: updating the channel matrix by multiplying a previous channel matrix by a phase component, wherein the phase component is based at least in part on one or more first unit vectors and one or more first angles of rotation associated with the first antenna array, one or more second unit vectors and one or more second angles of rotation associated with the second antenna array, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

Aspect 10: The method of any of aspects 1 through 9, further comprising: calculating a precoding matrix by applying singular value decomposition to the channel matrix, wherein the one or more beam steering metrics are associated with the precoding matrix.

Aspect 11: The method of any of aspects 1 through 10, further comprising: calculating a post-processing matrix by applying singular value decomposition to the channel matrix, wherein the one or more beam steering metrics are associated with the post-processing matrix.

Aspect 12: The method of any of aspects 1 through 11, wherein updating the channel matrix further comprises: updating a precoding matrix by multiplying a previous precoding matrix by a phase component.

Aspect 13: The method of aspect 12, wherein the phase component is based at least in part on a misalignment vector, a first location vector indicative of a location of an antenna element of the first antenna array with respect to a center of the first antenna array, and a distance vector indicative of a distance between the first antenna array and the second antenna array.

Aspect 14: The method of any of aspects 12 through 13, wherein the phase component is based at least in part on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

Aspect 15: The method of any of aspects 1 through 14, wherein updating the channel matrix further comprises: updating a post-processing matrix by multiplying a previous post-processing matrix by a phase component.

Aspect 16: The method of aspect 15, wherein the phase component is based at least in part on a misalignment vector, a first location vector indicative of a location of an antenna element of the first antenna array with respect to a center of the first antenna array, and a distance vector indicative of a distance between the first antenna array and the second antenna array.

Aspect 17: The method of any of aspects 15 through 16, wherein the phase component is based at least in part on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

Aspect 18: The method of any of aspects 1 through 17, further comprising: receiving one or more signals from the second wireless device, wherein identifying the translational or rotational misalignment is based at least in part on receiving the one or more signals, the one or more signals being reference signals.

Aspect 19: The method of any of aspects 1 through 18, wherein updating the channel matrix is based at least in part on the first antenna array being in a far field region with respect to the second antenna array.

Aspect 20: The method of any of aspects 1 through 19, wherein the first wireless device is a UE and the second wireless device is a base station, or the first wireless device is a base station and the second wireless device is a UE.

Aspect 21: An apparatus for wireless communications, comprising a processor; memory coupled with the processor; and instructions stored in the memory and executable by the processor to cause the apparatus to perform a method of any of aspects 1 through 20.

Aspect 22: An apparatus for wireless communications, comprising at least one means for performing a method of any of aspects 1 through 20.

Aspect 23: A non-transitory computer-readable medium storing code for wireless communications, the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
    identifying a translational or rotational misalignment between a first antenna array of the first wireless device and a second antenna array of a second wireless device that is in line-of-sight wireless communication with the first wireless device via a channel;
    updating a channel matrix for the channel based at least in part on the translational or rotational misalignment, the channel matrix updated with one or more beam steering metrics of the first antenna array so as to improve a beam alignment between the first antenna array and the second antenna array;
    communicating with the second wireless device in accordance with the updated channel matrix; and
    transmitting, to the second wireless device, an indication of the translational or rotational misalignment between the first antenna array and the second antenna array.

2. The method of claim 1, further comprising:
    identifying a misalignment vector based at least in part on the translational or rotational misalignment between the first antenna array of the first wireless device and the second antenna array of the second wireless device.

3. The method of claim 1, further comprising:
    identifying, for the first antenna array and based at least in part on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, wherein the x-axis and y-axis are orthogonal to a z-axis which is in a direction of the communications; and
    determining a rotation matrix based at least in part on either the first angle of rotation and the corresponding first unit vector or the second angle of rotation and, subsequently, the third angle of rotation.

4. The method of claim 1, wherein identifying the translational or rotational misalignment between the first antenna array of the first wireless device and the second antenna array of the second wireless device further comprises:
    receiving, from the second wireless device, an indication of the translational or rotational misalignment between the first antenna array and the second antenna array.

5. The method of claim 1, wherein identifying the translational or rotational misalignment between the first antenna array of the first wireless device and the second antenna array of the second wireless device further comprises:
    identifying that the translational or rotational misalignment is a translational misalignment wherein the first antenna array is shifted along an x-axis, a y-axis, or a combination thereof with respect to the second antenna array, wherein the x-axis and y-axis are orthogonal to a z-axis which is in a direction of the communications.

6. The method of claim 1, wherein identifying the translational or rotational misalignment between the first antenna array of the first wireless device and the second antenna array of the second wireless device further comprises:
    identifying that the translational or rotational misalignment is a rotational misalignment wherein the first antenna array is rotated around an x-axis, a y-axis, or a combination thereof with respect to the second antenna array, wherein the x-axis and y-axis are orthogonal to a z-axis which is in a direction of the communications.

7. The method of claim 1, wherein updating the channel matrix further comprises:
    updating the channel matrix by multiplying a previous channel matrix by a phase component, wherein the phase component is based at least in part on a misalignment vector, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

8. The method of claim 1, wherein updating the channel matrix further comprises:
    updating the channel matrix by multiplying a previous channel matrix by a phase component, wherein the phase component is based at least in part on one or more first unit vectors and one or more first angles of rotation associated with the first antenna array, one or more second unit vectors and one or more second angles of rotation associated with the second antenna array, a first location vector indicative of a location of an antenna element of the first antenna array with respect to a center of the first antenna array, a second location vector indicative of a location of an antenna element of the second antenna array with respect to a center of the second antenna array, and a distance vector indicative of a distance between the first antenna array and the second antenna array.

9. The method of claim 1, further comprising:
calculating a precoding matrix by applying singular value decomposition to the channel matrix, wherein the one or more beam steering metrics are associated with the precoding matrix.

10. The method of claim 1, further comprising:
calculating a post-processing matrix by applying singular value decomposition to the channel matrix, wherein the one or more beam steering metrics are associated with the post-processing matrix.

11. The method of claim 1, wherein updating the channel matrix further comprises:
updating a precoding matrix by multiplying a previous precoding matrix by a phase component.

12. The method of claim 11, wherein the phase component is based at least in part on a misalignment vector, a first location vector indicative of a location of an antenna element of the first antenna array with respect to a center of the first antenna array, and a distance vector indicative of a distance between the first antenna array and the second antenna array.

13. The method of claim 11, wherein the phase component is based at least in part on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

14. The method of claim 1, wherein updating the channel matrix further comprises:
updating a post-processing matrix by multiplying a previous post-processing matrix by a phase component.

15. The method of claim 14, wherein the phase component is based at least in part on a misalignment vector, a first location vector indicative of a location of an antenna element of the first antenna array with respect to a center of the first antenna array, and a distance vector indicative of a distance between the first antenna array and the second antenna array.

16. The method of claim 14, wherein the phase component is based at least in part on one or more unit vectors and one or more angles of rotation associated with the first antenna array, a first location vector indicative of a location of an antenna element of the first antenna array with respect to a center of the first antenna array, and a distance vector indicative of a distance between the first antenna array and the second antenna array.

17. An apparatus for wireless communications, comprising:
a processor;
memory coupled with the processor; and
instructions stored in the memory and executable by the processor to cause the apparatus to:
identify a translational or rotational misalignment between a first antenna array of a first wireless device and a second antenna array of a second wireless device that is in line-of-sight wireless communication with the first wireless device via a channel;
update a channel matrix for the channel based at least in part on the translational or rotational misalignment, the channel matrix updated with one or more beam steering metrics of the first antenna array so as to improve a beam alignment between the first antenna array and the second antenna array;
communicate with the second wireless device in accordance with the updated channel matrix; and
transmit, to the second wireless device, an indication of the translational or rotational misalignment between the first antenna array and the second antenna array.

18. The apparatus of claim 17, wherein the instructions are further executable by the processor to cause the apparatus to:
identify a misalignment vector based at least in part on the translational or rotational misalignment between the first antenna array of the first wireless device and the second antenna array of the second wireless device.

19. The apparatus of claim 17, wherein the instructions are further executable by the processor to cause the apparatus to:
identify, for the first antenna array and based at least in part on the translational or rotational misalignment between the first antenna array of the first wireless device and the second antenna array of the second wireless device, at least one of a first angle of rotation and a corresponding first unit vector, or a second angle of rotation with respect to an x-axis and a third angle of rotation with respect to a y-axis, wherein the x-axis and y-axis are orthogonal to a z-axis which is in a direction of the communications; and
determine a rotation matrix based at least in part on either the first angle of rotation and the corresponding first unit vector or the second angle of rotation and, subsequently, the third angle of rotation.

20. The apparatus of claim 17, wherein the instructions to identify the translational or rotational misalignment between the first antenna array of the first wireless device and the second antenna array of the second wireless device are further executable by the processor to cause the apparatus to:
receive, from the second wireless device, an indication of the translational or rotational misalignment between the first antenna array and the second antenna array.

21. The apparatus of claim 17, wherein the instructions to identify the translational or rotational misalignment between the first antenna array of the first wireless device and the second antenna array of the second wireless device are further executable by the processor to cause the apparatus to:
identify that the translational or rotational misalignment is a translational misalignment wherein the first antenna array is shifted along an x-axis, a y-axis, or a combination thereof with respect to the second antenna array, wherein the x-axis and y-axis are orthogonal to a z-axis which is in a direction of the communications.

22. The apparatus of claim 17, wherein the instructions to identify the translational or rotational misalignment between the first antenna array of the first wireless device and the second antenna array of the second wireless device are further executable by the processor to cause the apparatus to:
identify that the translational or rotational misalignment is a rotational misalignment wherein the first antenna array is rotated around an x-axis, a y-axis, or a combination thereof with respect to the second antenna array, wherein the x-axis and y-axis are orthogonal to a z-axis which is in a direction of the communications.

23. The apparatus of claim 17, wherein the instructions are further executable by the processor to cause the apparatus to:
calculate a precoding matrix by applying singular value decomposition to the channel matrix, wherein the one or more beam steering metrics are associated with the precoding matrix.

24. The apparatus of claim 17, wherein the instructions are further executable by the processor to cause the apparatus to:
calculate a post-processing matrix by applying singular value decomposition to the channel matrix, wherein the one or more beam steering metrics are associated with the post-processing matrix.

25. The apparatus of claim 17, wherein the instructions to update the channel matrix are further executable by the processor to cause the apparatus to:
update a precoding matrix by multiplying a previous precoding matrix by a phase component.

26. The apparatus of claim 17, wherein the instructions to update the channel matrix are further executable by the processor to cause the apparatus to:
update a post-processing matrix by multiplying a previous post-processing matrix by a phase component.

27. An apparatus for wireless communications, comprising:
means for identifying a translational or rotational misalignment between a first antenna array of a first wireless device and a second antenna array of a second wireless device that is in line-of-sight wireless communication with the first wireless device via a channel;
means for updating a channel matrix for the channel based at least in part on the translational or rotational misalignment, the channel matrix updated with one or more beam steering metrics of the first antenna array so as to improve a beam alignment between the first antenna array and the second antenna array;
means for communicating with the second wireless device in accordance with the updated channel matrix; and
means for transmitting, to the second wireless device, an indication of the translational or rotational misalignment between the first antenna array and the second antenna array.

28. A non-transitory computer-readable medium storing code for wireless communications, the code comprising instructions executable by a processor to:
identify a translational or rotational misalignment between a first antenna array of a first wireless device and a second antenna array of a second wireless device that is in line-of-sight wireless communication with the first wireless device via a channel;
update a channel matrix for the channel based at least in part on the translational or rotational misalignment, the channel matrix updated with one or more beam steering metrics of the first antenna array so as to improve a beam alignment between the first antenna array and the second antenna array;
communicate with the second wireless device in accordance with the updated channel matrix; and
transmit, to the second wireless device, an indication of the translational or rotational misalignment between the first antenna array and the second antenna array.

\* \* \* \* \*